United States Patent
Ness et al.

(10) Patent No.: US 9,060,319 B2
(45) Date of Patent: *Jun. 16, 2015

(54) VIRTUAL NEIGHBOR OBJECTS FOR MANAGING IDLE MODE MOBILITY IN A WIRELESS NETWORK

(71) Applicant: AT&T Mobility II LLC, Atlanta, GA (US)

(72) Inventors: Melissa Ness, Atlanta, GA (US); Thomas Wallace Henderson, Alpharetta, GA (US); Spyridon Kapoulas, New York, NY (US)

(73) Assignee: AT&T MOBILITY II LLC, Atlanta, GA (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/886,616

(22) Filed: May 3, 2013

(65) Prior Publication Data
US 2013/0244663 A1    Sep. 19, 2013

Related U.S. Application Data

(63) Continuation of application No. 12/614,033, filed on Nov. 6, 2009, now Pat. No. 8,451,784.

(51) Int. Cl.
*H04W 4/00* (2009.01)
*H04W 36/30* (2009.01)
(Continued)

(52) U.S. Cl.
CPC .............. *H04W 36/30* (2013.01); *H04W 12/00* (2013.01); *H04W 28/0247* (2013.01); *H04W 48/04* (2013.01); *H04W 48/00* (2013.01); *H04W 48/20* (2013.01); *H04W 84/045* (2013.01)

(58) Field of Classification Search
CPC ..... H04W 36/00; H04W 36/14; H04W 4/045; H04W 84/045; H04W 48/00; H04W 48/04; H04W 28/0247; H04W 12/00; H04L 12/2834; H04L 12/2858

USPC .......................................... 370/331, 329, 338
See application file for complete search history.

(56) References Cited

U.S. PATENT DOCUMENTS 5,539,748 A    7/1996   Raith
5,937,353 A    8/1999   Fapojuwo
(Continued)

FOREIGN PATENT DOCUMENTS

EP           2003914 A1    12/2008
WO           0158201        8/2001
WO         2008060236       5/2008

OTHER PUBLICATIONS

Email discussion Rapporteur (Qualcomm): 3GPP Draft; R2-093952 Inbound mobility to CSG Cell from UMTS Cell, 3rd Generation Partnership Project (3GPP), Mobile Competence Centre; 650, Route des Lucioles; F-06921 Sophia-Antipolis Cedex; France no. Los Angeles, USA; Jun. 23, 2009, XP050352137, [retrieved on Jun. 23, 2009] p. 2-3, paragraph 2.1.

(Continued)

*Primary Examiner* — Ricky Ngo
*Assistant Examiner* — Dewanda Samuel
(74) *Attorney, Agent, or Firm* — Amin, Turocy & Watson, LLP

(57) ABSTRACT

Idle mode reselection is presented herein. A virtual neighbor component can create at least one virtual neighbor object and associate the at least one virtual neighbor object with wireless access points. Further, a reselection component can facilitate idle mode reselection between a base station and a wireless access point of the wireless access points based on the at least one virtual neighbor object.

20 Claims, 28 Drawing Sheets

(51) Int. Cl.
*H04W 12/00* (2009.01)
*H04W 28/02* (2009.01)
*H04W 48/04* (2009.01)
*H04W 48/00* (2009.01)
*H04W 48/20* (2009.01)
*H04W 84/04* (2009.01)

(56) References Cited

U.S. PATENT DOCUMENTS

| | | | |
|---|---|---|---|
| 6,845,238 B1 | 1/2005 | Muller | |
| 6,993,334 B2 * | 1/2006 | Andrus et al. | 455/437 |
| 8,045,530 B2 * | 10/2011 | Haverinen et al. | 370/338 |
| 8,072,953 B2 * | 12/2011 | Mukherjee et al. | 370/338 |
| 8,175,005 B2 * | 5/2012 | Okmyanskiy et al. | 370/254 |
| 8,179,847 B2 | 5/2012 | Huber et al. | |
| 8,285,285 B2 * | 10/2012 | Kitazoe et al. | 455/436 |
| 8,498,664 B2 * | 7/2013 | Kim et al. | 455/525 |
| 8,644,274 B2 * | 2/2014 | Li et al. | 370/338 |
| 2002/0191562 A1 * | 12/2002 | Kumaki et al. | 370/331 |
| 2007/0270152 A1 | 11/2007 | Nylander et al. | |
| 2008/0101301 A1 | 5/2008 | Thomas et al. | |
| 2008/0200146 A1 | 8/2008 | Wang et al. | |
| 2009/0023424 A1 | 1/2009 | Martin et al. | |
| 2009/0094680 A1 | 4/2009 | Gupta et al. | |
| 2009/0124262 A1 | 5/2009 | Vela et al. | |
| 2009/0191862 A1 | 7/2009 | Amirijoo et al. | |
| 2009/0219888 A1 | 9/2009 | Chen et al. | |
| 2009/0318144 A1 | 12/2009 | Thomas et al. | |

OTHER PUBLICATIONS

Mitsubishi Electric: "EUTRAN Proxy in support of massive deployment of HNBs", 3GPP Draft; R3-080062 (HNB Proxy), 3rd Generation Partnership Project (3GPP), Mobile Competence Centre; 650, Route des Lucioles; F-06921 Sophia-Antipolis Cedex; France, vol. RAN WG3, no. Sorrento, Italy; Feb. 5, 2008, XP050163296, [retrived on Feb. 5, 2008] p. 1-3, paragraph 2.

Motorola: "PCID Confusion", 3GPP Draft; R2-092307-HENB_Inbound_Mobility_PCID_Confusion, 3rd Generation Partnership Project (3GPP), Mobile Competence Centre; 650, Route des Lucioles; F-06921 Sophia-Antipolis Cedex; France, no. Seoul, Korea; Mar. 17, 2009, XP050340071, [retrieved on Mar. 17, 2009] p. 1-3, paragraph 2.

International Search Report and Written Opinion for PCT Patent Application No. PCT/US2010/050444 mailed Jan. 25, 2011, 18 pages.

Office Action dated Jul. 20, 2012 for U.S Appl. No. 12/614,033, 35 pages.

Notice of Allowance dated Feb. 1, 2013 for U.S. Appl. No. 12/614,033, 25 pages.

* cited by examiner

VIRTUAL NEIGHBOR OBJECTS FOR MANAGING IDLE MODE MOBILITY IN A WIRELESS NETWORK

PRIORITY CLAIM

This patent application is a continuation of U.S. patent application Ser. No. 12/614,033, filed Nov. 6, 2009. The entirety of the aforementioned application is incorporated by reference herein.

BACKGROUND

Wireless devices, e.g., cellular based devices, are ubiquitous. Moreover, there is increased demand for cellular services in areas where such services may be limited, e.g., residential or small business environments. Accordingly, a small cellular base station, e.g., femtocell, coupled to a wireless service provider's network via a broadband connection, can be located in such environments to improve wireless service capacity and/or coverage.

In a cellular based system, a mobile wireless device can communicate with a base station within a wireless coverage area, or sector, of the base station. During a voice and/or data session, e.g., phone call, the mobile wireless device operates in an active mode while communicating with the base station. When the mobile wireless device is powered on between calls, the mobile wireless device operates in an idle mode. During the idle mode, the mobile wireless device can perform a reselection procedure to transition between base stations and/or wireless access points, e.g., based on base station/wireless access point signal quality. For example, the mobile wireless device can monitor one or more control and/or broadcast channels of proximate base stations to obtain information for selecting a base station for servicing an incoming/outgoing call in the active mode. Such information can include a neighbor list, which identifies channels of proximate base stations the mobile wireless device can monitor during the idle mode. As the mobile wireless device moves within a sector served by a base station, the mobile wireless device can monitor the channels of base stations and/or access points utilizing the neighbor list and determine a best channel for active mode operation.

As increased amounts of femtocells are integrated into a broader cellular network to improve wireless service capacity and/or coverage, conventional techniques cannot adequately account for tens, hundreds, thousands, etc. of femtocells included within a base station's sector using a neighbor list. Each item included in a neighbor list transmitted by a base station corresponds to only one base station and/or one access point within a sector of the base station. Further, conventional techniques limit a number of neighbors included in a base station neighbor list to 32. Consequently, if more than 32 femtocells are within a sector of a base station, then a mobile wireless device cannot use a neighbor list to monitor and/or select each femtocell within the sector during idle mode.

DETAILED DESCRIPTION

Figure 1:
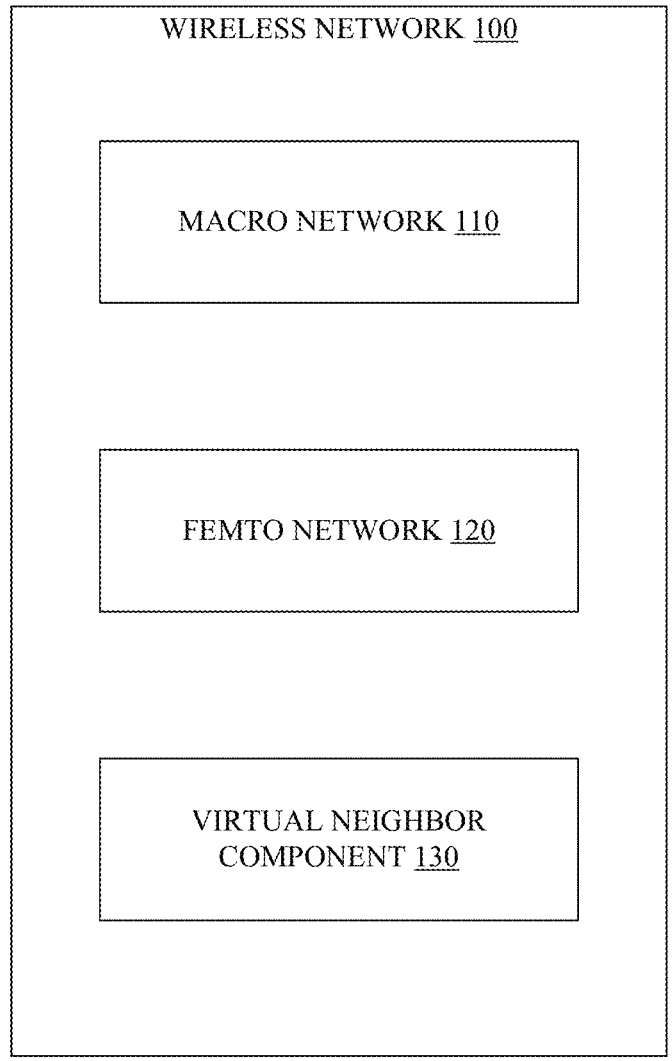
FIG. 1 illustrates a wireless network that includes a virtual neighbor component for facilitating optimal idle mode reselection, in accordance with an embodiment.

Various non-limiting embodiments of systems, methods, and apparatus are provided for facilitating effective management of idle mode mobility in a wireless-based communication infrastructure. Such an infrastructure can include femtocells, which are wireless access points that can interface with a wired or wireless broadband network. Femtocells usually use a licensed radio spectrum operated and controlled by a wireless service provider, and are generally deployed to improve indoor wireless coverage. Moreover, femtocells can reduce loading of over-the-air radio resources, e.g., radio frequency channels, operated by the wireless service provider. User equipment (UE), e.g., a mobile wireless device, cell phone, wireless communications device, etc. can be operated by a subscriber of the wireless service provider within a femto coverage area, or femto network including one or more femtocells.

The UE can communicate with a core network, e.g., wired broadband network, via a femto access point (AP), or femtocell, utilizing a femto based wireless protocol. The femto AP employs a backhaul network, e.g., broadband wired network backbone, to route packet communication, e.g., voice traffic, data traffic, data, etc., to the core network. Typically, the UE can register with the femto AP, and communication, such as voice and/or data traffic, can be routed to the subscriber via the femto AP utilizing the femto based wireless protocol. As used herein, the phrases "femto based wireless protocol," "femto wireless protocol," or "femto based communication," refer generally to a wireless protocol used to route data between a femto AP and UE, e.g., utilizing the licensed radio spectrum described above.

Further, the UE can communicate with the core network via a macro network that includes at least one base station generally intended to serve mobile wireless devices in outdoor locations. Each base station can employ a backhaul network, e.g., broadband wired or wireless network backbone, to route packet communication, e.g., voice traffic, data traffic, data, etc. to the core network. As the UE moves within the macro and/or femto networks between phone calls during idle mode, the UE can receive neighbor lists from proximate base stations and/or femto access points (APs). Each neighbor list received from a base station identifies a limited number of neighboring base stations and/or femto APs within a coverage area of the base station. The UE can select a base station and/or femto AP, e.g., associated with highest signal quality, from those identified via the neighbor list for servicing an incoming/outgoing call in active mode.

As increased amounts of femtocells are integrated into a broader cellular network to improve wireless service capacity and/or coverage, conventional techniques cannot adequately account for tens, hundreds, thousands, etc. of femtocells included within a base station's coverage area using a neighbor list. Each item included in a neighbor list transmitted by a base station corresponds to only one base station and/or access point within a coverage area, or sector, of the base station. Further, conventional techniques can limit a number of neighbors included in a base station neighbor list to 32. Consequently, if more than 32 femtocells are within a sector of a base station, then a mobile wireless device cannot use a neighbor list to monitor and/or select each femtocell within the sector during idle mode.

Compared to such techniques, various systems, methods, and apparatus described herein improve wireless customer experience(s) by effectively managing idle mode reselection between a cellular based macro network and a femto network.

Aspects, features, or advantages of the disclosed subject matter can be exploited in substantially any wireless telecommunication or radio technology, e.g., wireless fidelity (Wi-Fi™); Worldwide Interoperability for Microwave Access (WiMAX™); Enhanced General Packet Radio Service (Enhanced GPRS); 3GPP Long Term Evolution (LTE™); Third Generation Partnership Project 2 (3GPP2); Ultra Mobile Broadband (UMB); Third Generation Partnership Project (3GPP) Universal Mobile Telecommunication System (UMTS); High Speed Packet Access (HSPA); High Speed Downlink Packet Access (HSDPA); High Speed Uplink Packet Access (HSUPA); LTE™ Advanced (LTE-A), Global System for Mobile Communication (GSM), etc.

Additionally, one or more embodiments described herein can include legacy telecommunication technologies, e.g., plain old telephone service (POTS). It is also noted that selections of radio technology include second generation (2G), third generation (3G), and fourth generation (4G) evolution of the radio technology; however, such selections are not intended as a limitation of the disclosed subject matter and related aspects thereof. In addition, the aspects, features, or advantages of the disclosed subject matter can be exploited in disparate electromagnetic frequency bands. Moreover, one or more embodiments described herein can be executed in one or more network elements, such as a mobile wireless device, e.g., user equipment, and/or within one or more elements of a network infrastructure, e.g., radio network controller.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer readable media having various data structures stored thereon. The components may communicate via local and/or remote processes such as in accordance with a signal having one or more data packets (e.g., data from one component interacting with another component in a local system, distributed system, and/or across a network, such as the Internet, with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via provisioning component 1220 (described below) to automatically transmit a neighbor list from a wireless access point to a mobile wireless device; and automatically facilitate idle mode reselection between the wireless access point and another wireless access point via the mobile wireless device, based on, at least in part, the neighbor list.

In another example, the artificial intelligence system can be used, via reselection component 1000 (described below) to automatically facilitate idle mode reselection between a wireless access point and another wireless access point based on, at least in part, a channel number, a scrambling code, an at least one control parameter.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD)); smart card(s), and flash memory device(s) (e.g., card, stick, key drive).

Moreover, terms like "user equipment" (UE), "mobile station (MS)," "mobile subscriber station," "access terminal," "terminal," "handset," "appliance," "machine," and similar terminology refer to a wireless device utilized by a subscriber or user of a wireless communication service to receive and/or convey data associated with voice, video, sound, and/or substantially any data-stream or signaling-stream. Further, the foregoing terms are utilized interchangeably in the subject specification and related drawings. Likewise, the terms "local wireless communications cite," "access point" (AP), "base station," "Node B," "evolved Node B," "home Node B" (HNB), "home access point" (HAP), and the like are utilized interchangeably in the subject specification and drawings and refer to a wireless network component or apparatus that sends and/or receives data associated with voice, video, sound, and/or substantially any data-stream or signaling-stream between a set of subscriber stations—unless context warrants particular distinction(s) among the terms. Further, the data and signaling streams can be packetized or frame-based flows.

Furthermore, the terms "user," "subscriber," "customer," "consumer," "agent," "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formalisms, that can provide simulated vision, sound recognition, decision making, etc. Also, the terms "local wireless communications cite," "access point," "base station," and the like are utilized interchangeably throughout the subject specification, and refer to devices that can receive and transmit signal(s) from and to wireless devices through one or more antennas. In addition, the terms "wireless network" and "network" are used interchangeable in the subject application, unless context warrants particular distinction(s) among the terms.

FIG. 1 illustrates a wireless network 100 that includes a virtual neighbor component 130 for facilitating optimal idle mode reselection, in accordance with an embodiment. Wireless network 100 can further include macro network 110 and femto network 120. Macro network 110 can include at least one base station (not shown) that serves mobile wireless devices (not shown) in outdoor locations via a macro cell. The term "macro cell" generally refers to a coverage area, or geographical area, having a radius of at least one kilometer. The terms "microcell," "picocell," and "femtocell" generally refer to progressively smaller sized coverage areas.

While aspects and/or features of the subject disclosure are illustrated in relation to macro cells, femtocells, and femtocell access points, such aspects and/or features are also applicable to, and can be implemented in: a microcell, or microcell access point; a picocell, or picocell access point; a Wi-Fi™ access point; a WiMAX™ access point, a Bluetooth™ access point, other wireless-based access points; or the like. Further, macro network 110 can include a core network (not shown) comprising one or more cellular technologies, e.g., 3GPP UMTS, GSM, etc. Each base station, or access point, of macro network 110 can communicate with the core network via a wired backbone link (not shown), e.g., optical fiber, twisted-pair, coaxial cable, etc.

Femto network 120 can include femtocells (not shown), which are wireless access points that can interface with macro network 110. It should be appreciated that although femto network 120 is illustrated in FIG. 1 as an entity distinct from macro network 110, femto network 120 can be located/included within and/or across one or more locations, components, e.g., hardware, software, etc., of macro network 110. For example, one or more femtocells of femto network 120 can be located within a macro cell served by a base station of macro network 110.

A mobile wireless device served by macro network 110, and operated by a subscriber within a femto coverage area of femto network 120, can communicate with the core network of macro network 110 via one or more femto access points (APs) (not shown). Typically, the mobile wireless device can register with a femto AP and communication, e.g., voice or data traffic, can be routed to the subscriber through the femto AP utilizing a femto based wireless protocol, e.g., based on a licensed or unlicensed radio spectrum. The femto AP can employ a backhaul network (not shown), e.g., broadband wired or wireless network backbone, to route packet communication, e.g., voice traffic, data traffic, data, etc. to the core network of macro network 110.

As the mobile wireless device moves within and/or between macro network 110 and femto network 120 during idle mode, e.g., between phone calls, it can receive a neighbor list transmitted from a proximate base station and/or access point. The mobile wireless device can select a base station or femto AP from the neighbor list to service incoming/outgoing calls during active mode. Conventional neighbor lists contain a small number of broadcast channels from which the mobile wireless device can select from in order to service incoming/outgoing calls during active mode. Moreover, each broadcast channel, or reference to a base station/femto AP, corresponds to only one access point within a coverage area, or sector, of the proximate base station and/or access point. Consequently, if more femtocells are within a sector of a base station than can be identified in a neighbor list, a mobile wireless device cannot use the neighbor list to select from each femtocell within the sector during idle mode. For example, if a residential area within a base station sector contains over 50 femtocells, and a neighbor list transmitted from the base station to a mobile wireless device only identifies 32 neighbors, the mobile wireless device cannot reselect to each femtocell in the base station sector using the neighbor list.

Compared to conventional techniques, virtual neighbor component 130 can enable effective idle mode reselection between macro and femto networks, e.g., between femto network 110 and macro network 120, by utilizing virtual femto neighbor objects in neighbor lists (not shown). Accordingly, with respect to the example above, virtual neighbor component 130 can enable the base station to account for the over 50 femtocells via the neighbor list by assigning more than one femtocell to a virtual neighbor object. As such, each virtual neighbor object included in the neighbor list can identify multiple femtocells within the base station sector. In addition, because a virtual neighbor object can identify multiple access points, less than 32 entries in a neighbor list can be used to identify all base stations and/or femto APs within a coverage area during idle mode.

It should be appreciated that although virtual neighbor component 130 is illustrated in FIG. 1 as an entity distinct from macro network 110 and femto network 120, virtual neighbor component 130 can be located/included within and/or across one or more components, e.g., hardware, software, etc., of wireless network 100, e.g., within or among hardware and/or software of components of macro network 110 and/or femto network 120.

Figure 2:
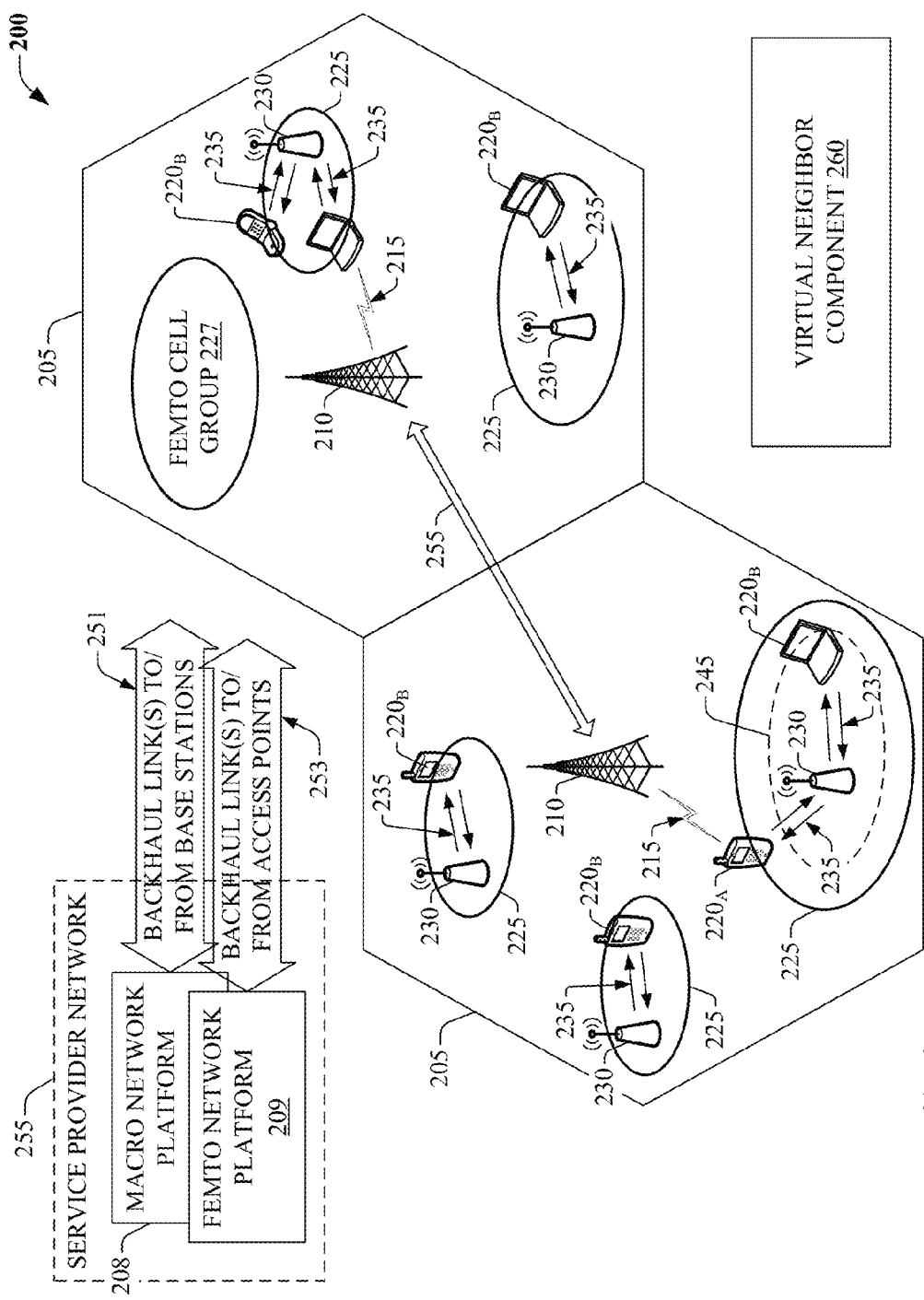
FIG. 2 illustrates a wireless environment that includes a virtual neighbor component for facilitating effective idle mode reselection, in accordance with an embodiment.

FIG. 2 illustrates a wireless environment 200 that includes a virtual neighbor component 260 for facilitating effective idle mode reselection, in accordance with an embodiment. Each macro cell 205 represents a "macro" cell coverage area, or sector, served by a base station 210. It should be appreciated that although macro cells 205 are illustrated as hexagons, macro cells 205 can adopt other geometries generally dictated by a deployment or topography of the macro cell coverage area, or covered geographic area, e.g., metropolitan statistical area (MSA), rural statistical area (RSA), etc. Macro cell coverage is generally intended to serve mobile wireless devices, e.g., mobile wireless device $220_A$, mobile wireless device $220_B$, in outdoor locations. An over-the-air wireless link 215 provides the macro coverage, and wireless link 215 comprises a downlink (DL) and an uplink (UL) (both not shown) that can utilize a predetermined band of radio frequency (RF) spectrum associated with, e.g., GSM, 3GPP UMTS. Accordingly, mobile wireless device $220_A$ can be a GSM or 3GPP UMTS mobile phone, while $220_B$ can be a remote computing device with GSM or 3GPP UMTS capabilities.

Base station 210—including associated electronics, circuitry and/or components—and wireless link 215 form a radio network, e.g., base station subsystem (BSS) associated with a GSM wireless network, or radio access network (RAN) associated with a UMTS wireless network. In addition, base station 210 communicates with macro network platform 208 via backhaul link(s) 251. Macro network platform 208 represents a core network comprising one or more cellular wireless technologies, e.g., 3GPP UMTS or GSM. In one aspect, macro network platform 208 controls a set of base stations 210 that serve either respective cells or a number of sectors within such cells. Macro network platform 208 can also communicate with other base stations (not shown) that serve other cells (not shown). Backhaul link(s) 251 can include a wired backbone link, e.g., optical fiber backbone, twisted-pair line, T1/E1 phone line, synchronous or asynchronous digital subscriber line (DSL), asymmetric DSL (ADSL), coaxial cable, etc. Moreover, backhaul links(s) 251 can link disparate base stations 210 based on macro network platform 208.

Packet communication, e.g., voice traffic, data traffic, is typically routed through a broadband wired network backbone (or backhaul network) utilizing, e.g., optical fiber backbone, twisted-pair line, T1/E1 phone line, synchronous or asynchronous digital subscriber line (DSL), asymmetric DSL (ADSL), coaxial cable, etc. To this end, base station 210 is typically connected to the backhaul network, e.g., service provider network 255, via a broadband modem (not shown) and backhaul link(s) 251. Through backhaul link(s) 251, base station 210 can handle substantially any quality of service (QoS) for heterogeneous packetized traffic, e.g., various multiple packet flows.

Base station 210 can integrate into an existing network, e.g., GSM or 3GPP network, via various interfaces, for example: via an A-bis interface (not shown) between a base transceiver station (BTS) and a base station controller (BSC);

via an Iub interface (not shown) between a radio network controller (RNC) and base station 210; via an interface (not shown) between an RNC and a Circuit Switched Core Network (CS-CN); via an interface (not shown) between an RNC and an Iu-CS interface; via an interface (not shown) between an RNC and a Packet Switched Core Network (or Iu-PS interface); via an interface (not shown) between a BSC and a mobile switching center (MSC) and/or Network Switching Subsystem (NNS); via an interface (not shown) between a Serving General Packet Radio Service Support Node (SGSN) and a public data network (PDN) (or Gi interface); via an interface (not shown) between an SGSN and other SGSNs (or Gn interface).

A group of femtocells 225 served by respective femto access points (APs) 230 can be deployed within each macro cell 205. While three femtocells 225 are deployed per macro cell 205 as shown in FIG. 2, aspects of the subject disclosure can be directed to femtocell deployments with substantive femto AP 230 density, e.g., $10^4$-$10^8$ femto APs 230 per base station 210. As such, femtocell group 227 as illustrated in FIG. 2 includes more than $10^4$ femto APs 230 (not shown). Femtocell 225 typically covers an area (or coverage area) that includes confined area 245, which is determined, at least in part, by transmission power allocated to femto AP 230, path loss, shadowing, etc. While the confined area 245 and coverage area typically coincide, it should be appreciated that in certain deployment scenarios, the coverage area can include an outdoor portion, e.g., parking lot, patio deck, recreation area; while confined area 245 can be enclosed by a building, e.g., home, retail store, business. The coverage area typically is spanned by a coverage radius ranging from 20 to 100 meters. Confined area 245 is generally associated with an indoor space and/or building, such as a residential space, e.g., house, condominium, apartment complex, etc.; business space, e.g., retail store, mall, etc.; or public space, e.g., library, hospital, etc. Such spaces can span about 5000 sq. ft.

Femto AP 230 typically serves a few (e.g., 2-5) wireless devices, e.g., UE 220$_A$ and subscriber station 220$_B$, within the coverage area associated with respective femtocells 225—each wireless device coupled to femto AP 230 via a wireless link 235 that comprises a downlink and an uplink (depicted as arrows in FIG. 2). A femto network platform 209 can control such service(s), in addition to registering femto APs, provisioning femto APs, managing macro-to-femto handover, and managing femto-to-macro handover. Control or management is facilitated by access point backhaul link(s) 253 that connect deployed femto APs 230 with femto network platform 209. Access point backhaul link(s) 253 are substantially similar to backhaul link(s) 251.

Femto network platform 209 also includes components, e.g., nodes, gateways, interfaces, that facilitate packet-switched (PS), e.g., internet protocol (IP), traffic and signal generation for networked telecommunication. It should be appreciated that femto network platform 209 can integrate seamlessly with substantially any PS-based and/or circuit switched (CS)-based network (such as macro network platform 208). Thus, operation with a wireless device such as 220$_A$ is substantially seamless when handover from femto-to-macro, or vice versa, occurs.

As an example, femto AP 230 can integrate into an existing network, e.g., GSM or 3GPP network, via various interfaces, for example: via an A-bis interface (not shown) between a base transceiver station (BTS) and a base station controller (BSC); via an Iub interface (not shown) between a radio network controller (RNC) and base station 210; via an interface (not shown) between an RNC and a Circuit Switched Core Network (CS-CN); via an interface (not shown) between an RNC and an Iu-CS interface; via an interface (not shown) between an RNC and a Packet Switched Core Network (or Iu-PS interface); via an interface (not shown) between a BSC and a mobile switching center (MSC) and/or Network Switching Subsystem (NNS); via an interface (not shown) between a Serving General Packet Radio Service Support Node (SGSN) and a public data network (PDN) (or Gi interface); via an interface (not shown) between an SGSN and other SGSNs (or Gn interface).

Substantially all voice or data active sessions associated with subscribers within femtocell coverage, e.g., coverage area associated with femtocell 225, are terminated once the femto AP 230 is shut down; however, for data sessions, data can be recovered at least in part through a buffer, e.g., memory, associated with a femto gateway at femto network platform 209. Coverage of a suspended (or hotlined) subscriber station, or an associated account, can be blocked, e.g., over an associated air-interface. If a suspended or hotlined customer who owns a femto AP 230 is in Hotline/Suspend status, there is no substantive impact to customers covered through the subject femto AP 230. In another aspect, femto AP 230 can exploit high-speed downlink packet access via an interface with macro network platform 208, or through femto network platform 209, in order to accomplish substantive bitrates.

As described above, conventional idle mode reselection techniques cannot adequately account for tens, hundreds, thousands, etc. of femtocells included within a sector of a base station since (1) each reference included in a conventional neighbor list corresponds to only one base station/femto AP within the sector and (2) such techniques limit neighbor lists to contain a small amount of references, e.g., 32. Accordingly, virtual neighbor component 260 can facilitate optimal idle mode reselection within wireless network 200 by enabling reuse of virtual neighbor object references in neighbor lists—the virtual neighbor object references identifying multiple base stations/femtocells, e.g., base stations 210/femto APs 230, within wireless network 200.

It should be appreciated that although virtual neighbor component 260 is illustrated in FIG. 2 as an entity distinct from, e.g., base stations 210, femto APs 230, mobile wireless devices 220$_A$ and 220$_B$, service provider network 225, etc., aspects and/or features of virtual neighbor component 260 can be located/included within and/or across one or more components, e.g., hardware, software, etc., of wireless network 200. For example, in one embodiment, virtual neighbor component 260 can be located within any component(s) of a GSM and/or UMTS core network, e.g. service provider network 255. In another embodiment, virtual neighbor component 260 can be located in hardware and/or software of base stations 210, femto APs 230, and/or mobile wireless devices 220$_A$ and 220$_B$. Moreover, it should be appreciated that features and advantages of the subject innovation can be implemented in microcells, picocells, or the like, wherein base station 210 can be embodied in an access point.

Figure 3:
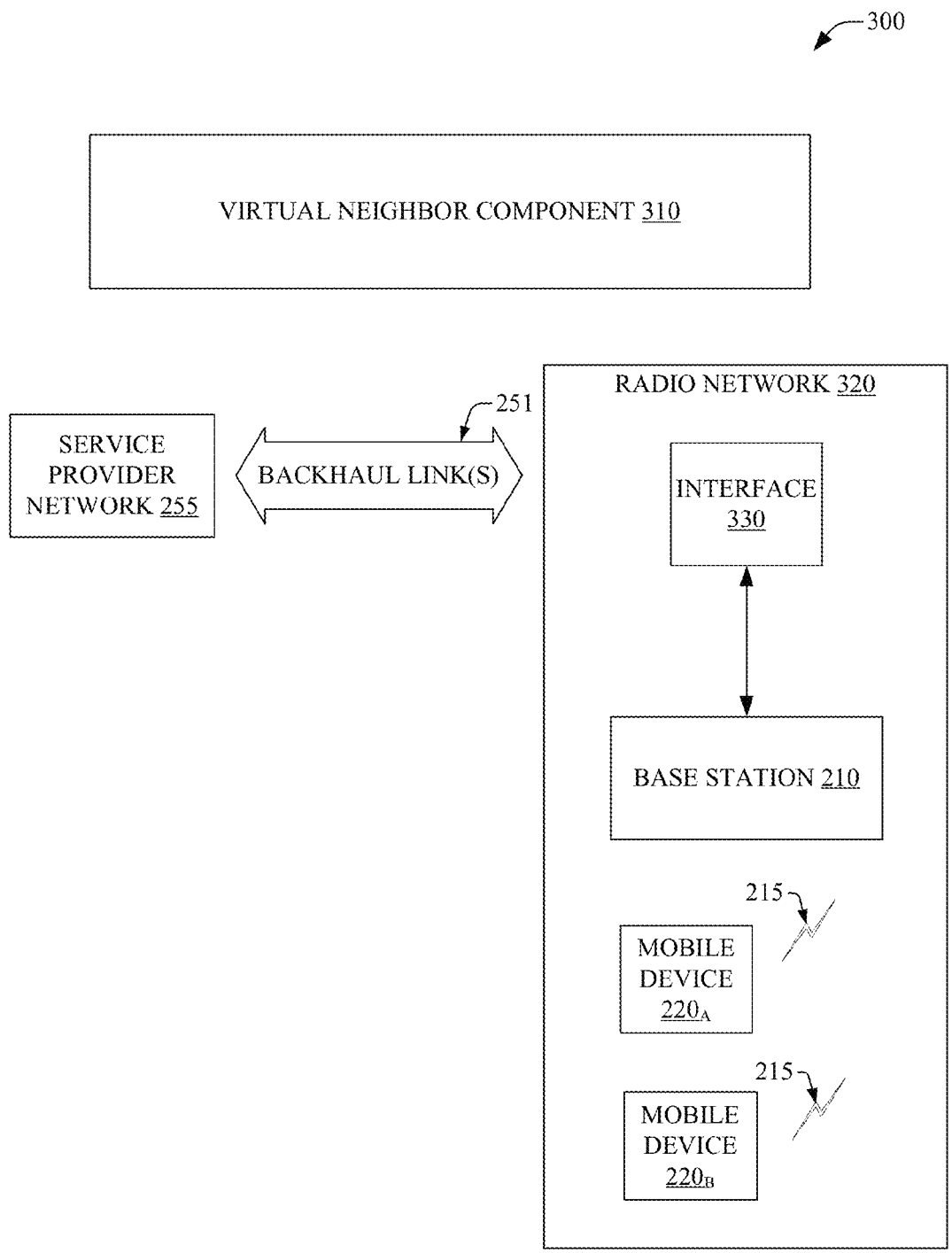
FIG. 3 illustrates another wireless environment that facilitates effective idle mode reselection, in accordance with an embodiment.

FIG. 3 illustrates another wireless environment (300) that facilitates effective idle mode reselection, in accordance with an embodiment. Wireless environment 300 can comprise one or more base stations 210, for example: coupled to a BSC forming a base station system (BSS) (see, e.g., FIG. 4); coupled to an RNC forming a UMTS Terrestrial Radio Access Network (UTRAN) (see, e.g., FIG. 5). Radio network 320 can couple to a core network, e.g., service provider network 255, via one or more backhaul links 251 (see above) to facilitate wireless communication and data transfer to one or more wireless devices, e.g., mobile wireless device 220$_A$/mobile wireless device 220$_B$, in accordance with the disclosed subject matter. Radio network 320 can comprise any wireless technology, e.g., GSM, UMTS. Wireless environment 300 includes virtual neighbor component 310 that can facilitate optimal idle mode reselection, e.g., between and/or among macro network 110 and femto network 120 (see above), within any wireless technology supporting idle mode reselection, e.g., GSM, 3GPP UMTS.

It should be appreciated that although virtual neighbor component 310 is illustrated in FIG. 3 as an entity distinct from radio network 320 and service provider network 255, virtual neighbor component 310 can be located/included within and/or across one or more components, e.g., hardware, software, etc., of wireless environment 300, e.g., within or among hardware and/or software of components of radio network 320 and/or service provider network 255.

Further, one or more aspects of wireless environment 300, and the wireless environments, networks, systems, apparatus, and processes explained herein, may constitute machine-executable instructions embodied within a machine, e.g., computer, readable medium, which when executed by a machine will cause the machine to perform the operations described. Additionally, the systems and processes may be embodied within hardware, such as an application specific integrated circuit (ASIC) or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

Conventional idle mode reselection techniques utilizing neighbor lists cannot adequately account for integration of femtocells within a cellular based macro network because such neighbor lists contain a small number of references, and each reference corresponds to only one access point within a sector of a base station/femto AP. Compared to such techniques, various systems, methods, and apparatus described herein facilitate effective idle mode reselection between a macro network and a femto network by utilizing virtual neighbor objects. For example, virtual neighbor component 310 can facilitate referencing multiple base stations, and/or femto APs, within wireless environment 300 with one virtual neighbor object.

Figure 4:
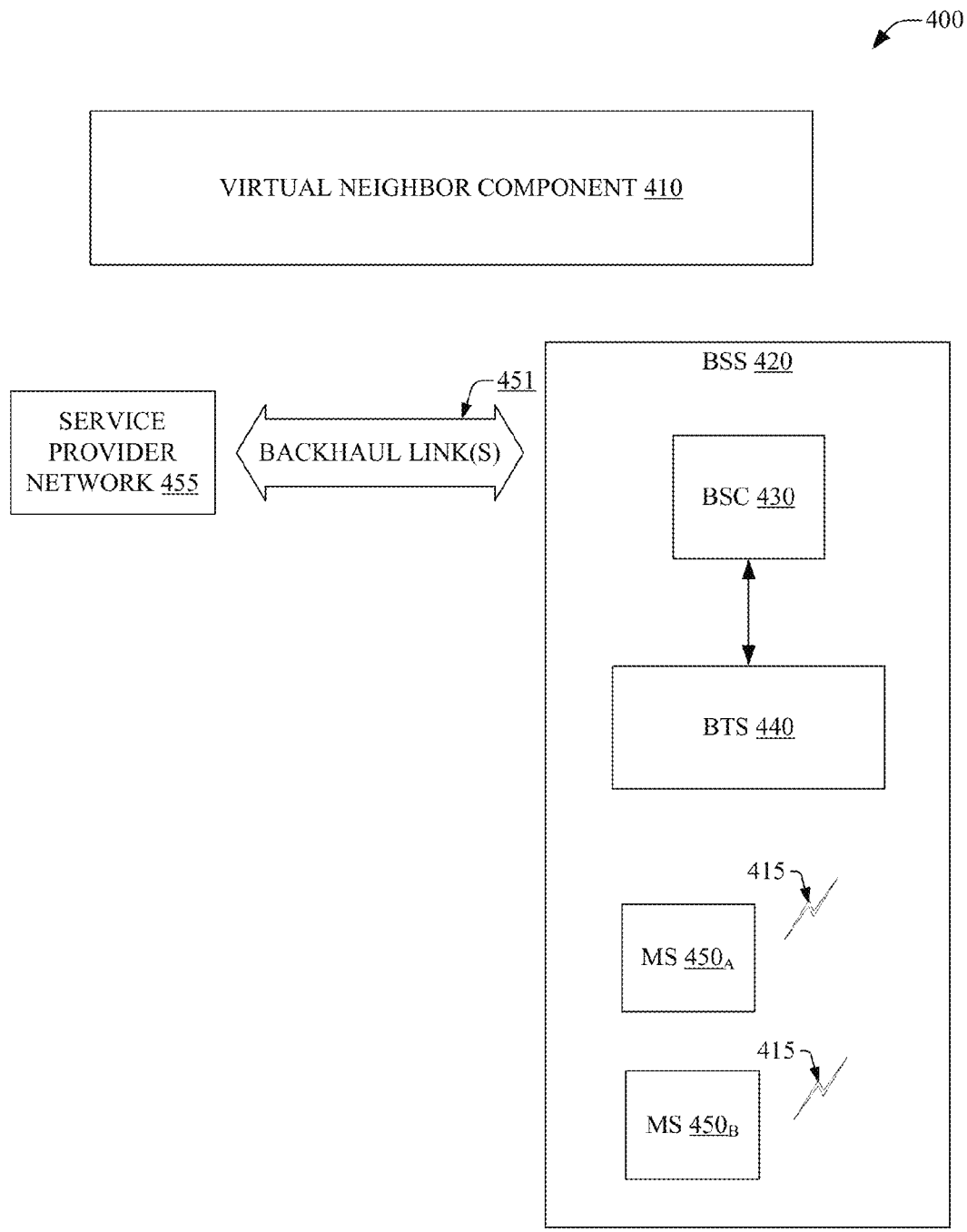
FIG. 4 illustrates a GSM wireless environment that facilitates effective idle mode reselection, in accordance with an embodiment.

FIG. 4 illustrates a GSM wireless environment 400 that facilitates effective idle mode reselection, in accordance with an embodiment. GSM wireless environment 400 can include at least one base transceiver station (BTS) 440 coupled to base station controller (BSC) 430 to form a base station subsystem (BSS) 420 of a GSM network. BSS 420 can be coupled to a core network, e.g., service provider network 455, via one or more backhaul links 451 (see above) to facilitate wireless communication and data transfer to one or more wireless devices, e.g., mobile station $450_A$/mobile station $450_B$, in accordance with the disclosed subject matter. GSM wireless environment 400 includes virtual neighbor component 410, which can facilitate optimal idle mode reselection between and/or among BTS 440 and a femto AP (not shown) within the GSM network utilizing virtual neighbor objects (see above). It should be appreciated that although virtual neighbor component 410 is illustrated in FIG. 4 as an entity distinct from other entities and/or components of GSM wireless environment 400, one or more aspects of virtual neighbor component 410 can be located/included within one or more components, e.g., hardware, software, etc. (e.g., BSS 420, femto AP (not shown)), of GSM wireless environment 400.

Figure 5:
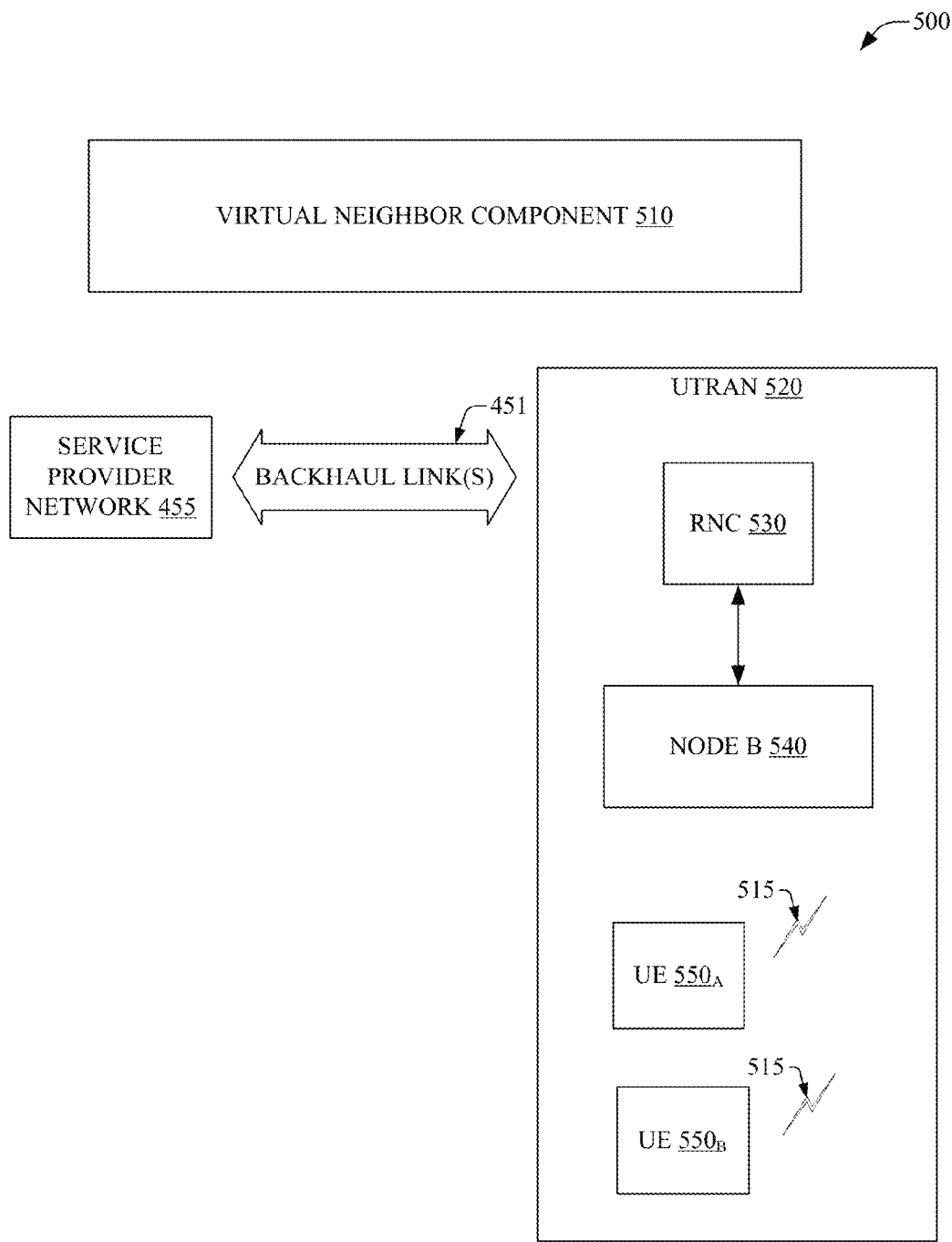
FIG. 5 illustrates a UMTS wireless environment that facilitates optimal idle mode reselection, in accordance with an embodiment.

FIG. 5 illustrates a UMTS wireless environment 500 that facilitates optimal idle mode reselection, in accordance with an embodiment. UMTS wireless environment 500 can include at least one node B 540 coupled to a radio network controller 530 to form a UMTS Terrestrial Radio Access Network (UTRAN) 520 of a UMTS network. UTRAN 520 can couple to a core network, e.g., service provider network 555, via one or more backhaul links 551 (see above) to facilitate wireless communication and data transfer to one or more wireless devices, e.g., user equipment $550_A$/user equipment $550_B$, in accordance with the disclosed subject matter. UMTS wireless environment 500 includes virtual neighbor component 510 that can facilitate optimal idle mode reselection between and/or among node B 540 and a femto AP (not shown) within the UMTS network, e.g., a 3GPP network, utilizing virtual neighbor objects (see above). It should be appreciated that although virtual neighbor component 510 is illustrated in FIG. 5 as an entity distinct from other entities and/or components of UMTS wireless environment 500, one or more aspects of virtual neighbor component 510 can be located/included within one or more components, e.g., hardware, software, etc. (e.g., UTRAN 520, femto AP (not shown)), of UMTS wireless environment 500, e.g., a 3GPP network.

Figure 6:
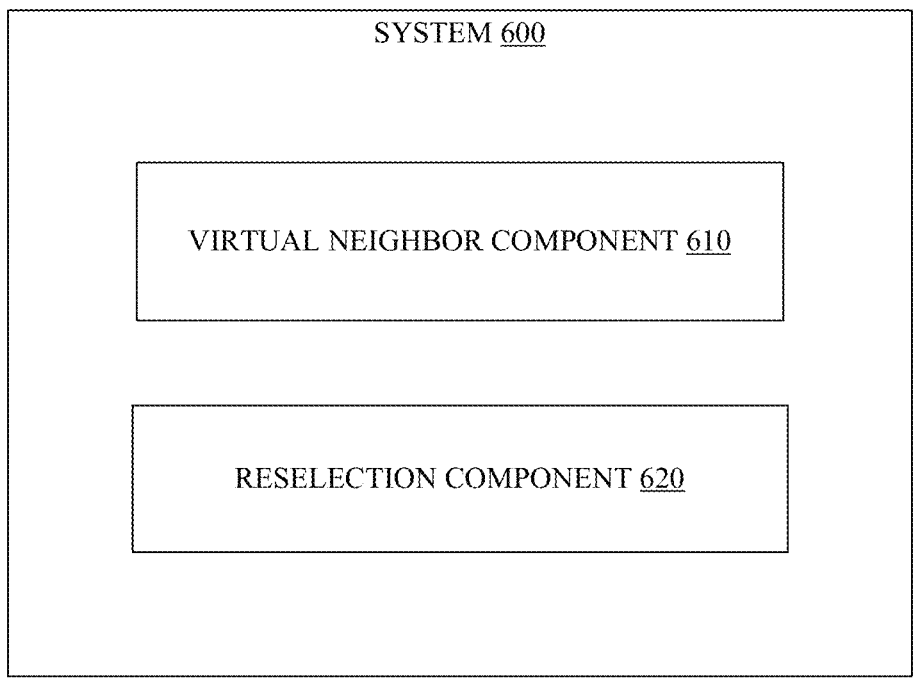
FIG. 6 illustrates a system that provides for effective idle mode reselection in a wireless-based communication infrastructure, in accordance with an embodiment.

FIG. 6 illustrates a system 600 that provides for effective idle mode reselection in a wireless-based communication infrastructure, in accordance with an embodiment. System 600 can include a virtual neighbor component 610 and a reselection component 620. Virtual neighbor component 610 can be configured to create at least one virtual neighbor object and associate the at least one virtual neighbor object with at least two wireless access points. For example, virtual neighbor component can create six virtual neighbor objects and associate more than one access point, e.g., base station, femto AP, etc. of a wireless network, e.g., a 3GPP network or GSM network, with one of the six virtual neighbor objects.

In an aspect, the at least two wireless access points can include at least one of: a microcell; a microcell access point; a picocell; a picocell access point; a Wi-Fi™ access point; a WiMAX™ access point; a Bluetooth™ access point; an Enhanced GPRS access point; a 3GPP access point; an LTE™ access point; a 3GPP2 access point; a UMB access point; a 3GPP UMTS access point; a HSPA access point; a HSDPA access point; a HSUPA access point; an LTE-A access point; or a GSM access point.

Figure 7:
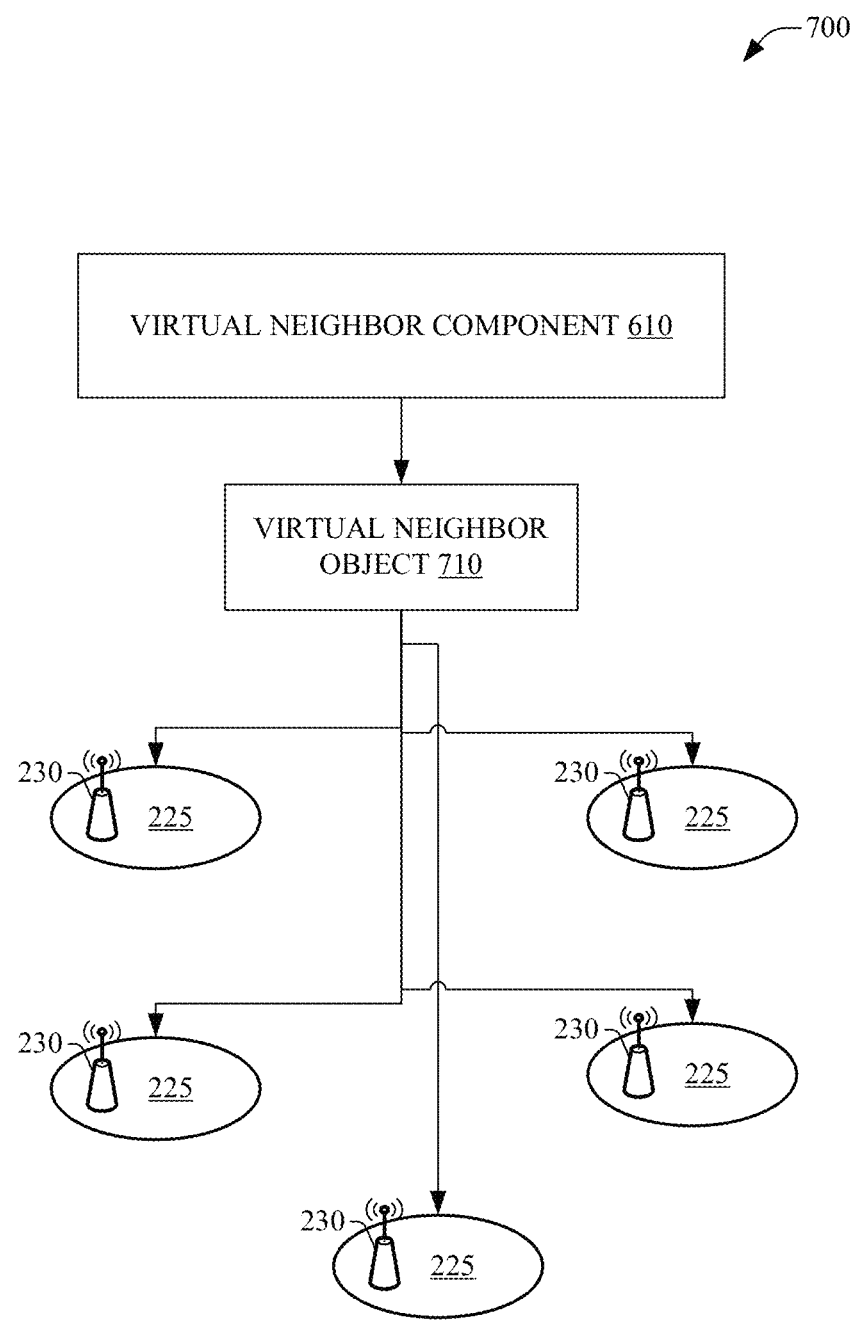
FIG. 7 illustrates a virtual neighbor object referencing multiple femtocells of a wireless network, in accordance with an embodiment.

In another aspect, illustrated by FIG. 7, virtual neighbor component 610 can create a virtual neighbor object 710 and associate virtual neighbor object 710, e.g., as a reference, with five femtocells 225 of wireless network 700. As described below, one or more mobile wireless devices (not shown) can select one of the five femtocells 225 for active mode servicing based on virtual neighbor object 710 and one or more access restrictions. Further, it should be appreciated that although virtual neighbor component 610 can reference, or associate, five femtocells 225 with virtual neighbor object 710, virtual neighbor component 610 can associate virtual neighbor object 710 with many more femtocells 225, e.g., $10^8$ femto APs 230 per base stations 210, throughout wireless network 700.

Now returning to FIG. 6, reselection component 620 of system 600 can be configured to facilitate idle mode reselection between a wireless access point of the at least two wireless access points and an other wireless access point based on, at least in part, the at least one virtual neighbor object. In one embodiment, the other wireless access point can include: a microcell; a microcell access point; a picocell; a picocell access point; a Wi-Fi™ access point; a WiMAX™ access point; a Bluetooth™ access point; an Enhanced GPRS access point; a 3GPP access point; an LTE™ access point; a 3GPP2 access point; a UMB access point; a 3GPP UMTS access point; a HSPA access point; a HSDPA access point; a HSUPA access point; an LTE-A access point; or a GSM access point.

As described above, a mobile wireless device can perform a reselection procedure between phone calls, e.g., during idle mode, to transition between base stations and/or femtocells, e.g., based on received signal quality. The mobile wireless device can receive information via control/broadcast channels of the base stations and/or femtocells in the form of a neighbor list, which can identify base stations and/or femtocells within a coverage area and/or sector of an associated base station and/or femtocell. Unfortunately, conventional techniques cannot adequately account for tens, hundreds, thousands, etc. of femtocells included within the coverage area and/or sector using the neighbor list because each item, or reference, included in the neighbor list only corresponds to one base station and/or access point.

In contrast, reselection component 620 can facilitate idle mode reselection based on at least one neighbor list entry, e.g., virtual neighbor object, which can refer to multiple base stations and/or femto APs. Referring to the example above, and referencing FIG. 7, reselection component 620 can facilitate idle mode reselection between a base station (not shown) and one of the femtocells 225 based on, at least in part, virtual neighbor object 710. Further, as described below, reselection component 620 can facilitate such reselection, at least in part, based on one or more access restrictions.

Figure 8:
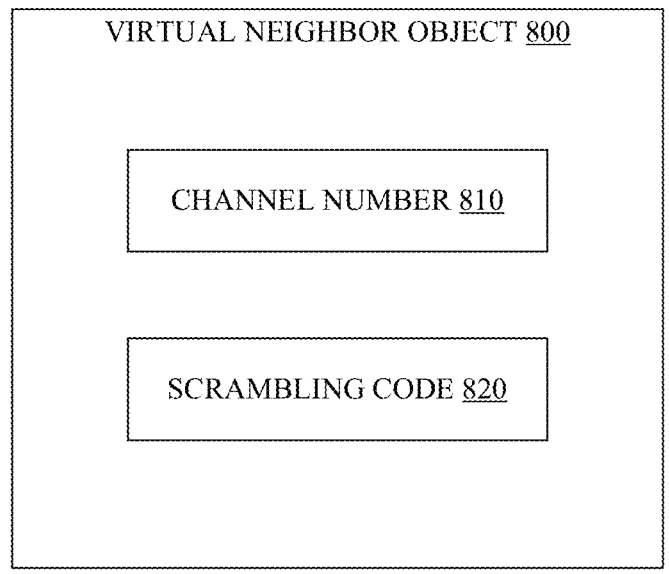
FIG. 8 illustrates a virtual neighbor object, in accordance with an embodiment.

FIG. 8 illustrates a virtual neighbor object 800, in accordance with an embodiment. Virtual neighbor object 800 can include a channel number 810 and/or a scrambling code 820 (as illustrated, scrambling code 820 is included). Channel number 810 can be associated with a control channel and/or a broadcast channel of an access point, e.g., base station, femtocell, etc., and used by a mobile wireless device to monitor and/or communicate with the access point, e.g., for servicing an incoming/outgoing call in the active mode. Scrambling code 820 can be used for scrambling transmissions from the access point, e.g., for scrambling Primary Common Control Physical Channel (P-CCPCH) transmissions from node B 540 of UMTS wireless environment 500. In one embodiment, reselection component 620 of system 600 can be configured to facilitate idle mode reselection between wireless access points, e.g., between a base station and a femto AP, based on, at least in part, channel number 810 and/or scrambling code 820.

Figure 9:
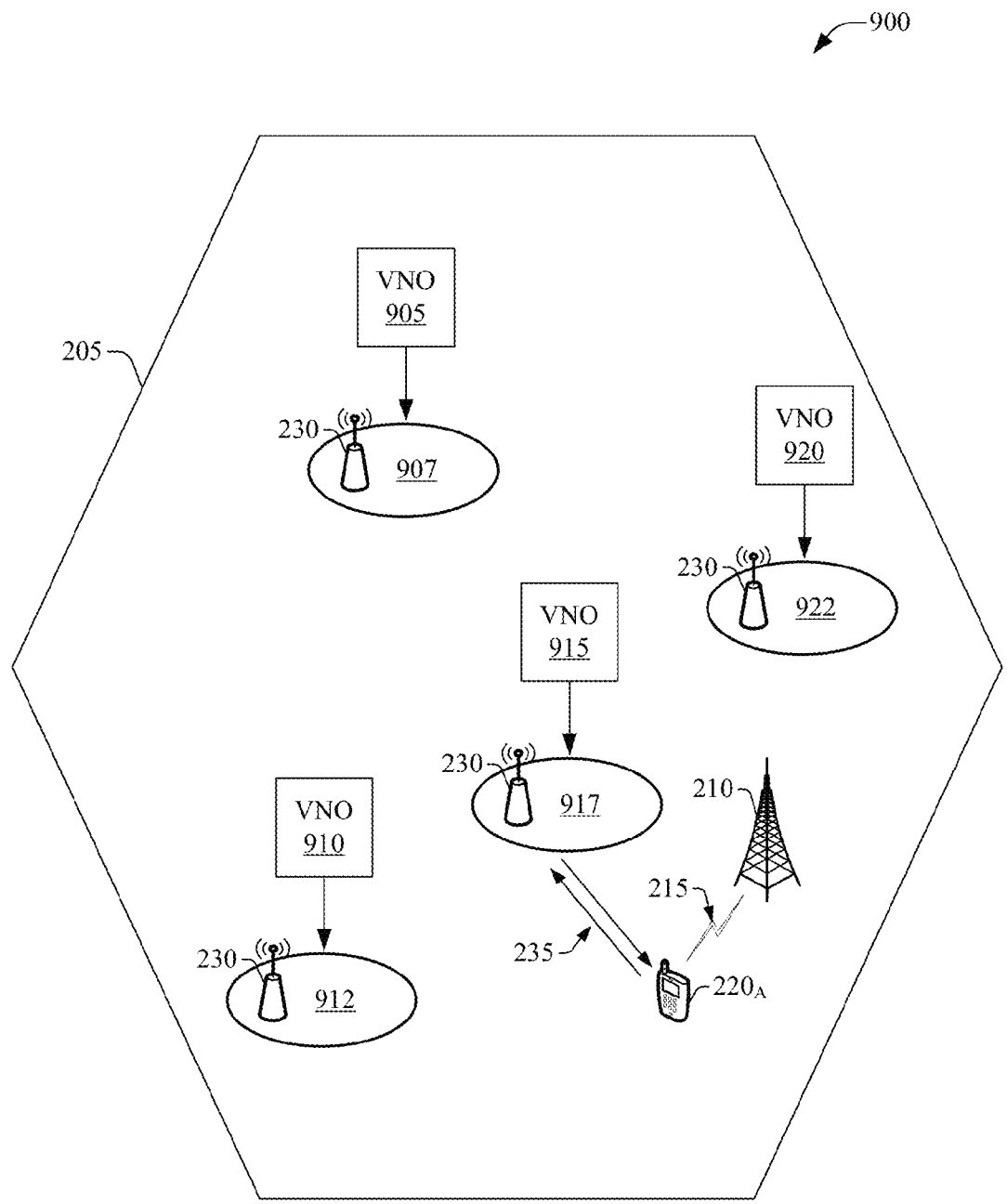
FIG. 9 illustrates a wireless environment utilizing different virtual neighbor objects, in accordance with an embodiment.

For example, in an example wireless environment 900 illustrated by FIG. 9, different virtual neighbor objects (905, 910, 915, 920) comprising different combinations of channel numbers 810 and scrambling codes 820 can be associated with different femtocells (907, 912, 917, 922). Reselection component 620 can be configured to facilitate idle mode reselection from base station 210 to femtocell 917 based on, at least in part, a channel number 810 and a scrambling code 820 associated with virtual neighbor object 915.

Figure 10:
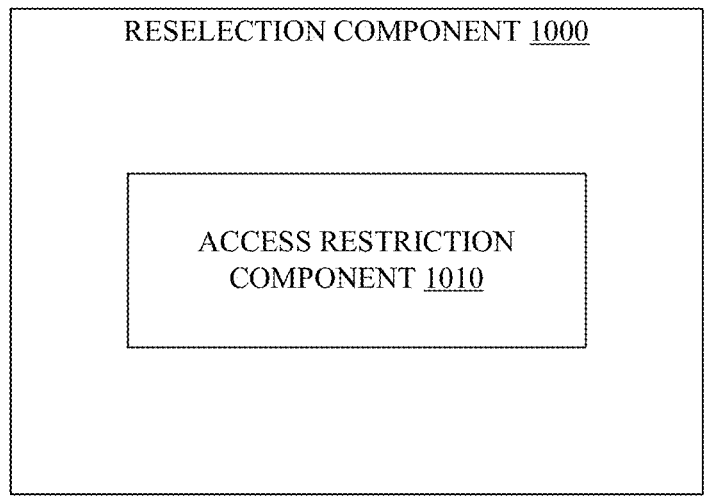
FIG. 10 illustrates a reselection component including an access restriction component, in accordance with an embodiment.

FIG. 10 illustrates a reselection component 1000 that includes an access restriction component 1010, in accordance with an embodiment. Access restriction component 1010 can be configured to define at least one access restriction associated with at least one wireless access point of the at least two wireless access points discussed in relation to system 600 above. For example, the at least one access restriction can comprise an identification (ID) associated with a mobile wireless device affected by the idle mode reselection, e.g., a user ID associated with the mobile wireless device. In another aspect, the at least one access restriction can be associated with an ACL (see above). In yet another aspect, the at least one access restriction can relate to one or more signals associated with communication between a mobile wireless device and one or more femtocells. For example, the at least one access restriction can relate to signal quality of the one or more signals.

In an aspect, the at least one access restriction can prevent access to the wireless access point of the at least two wireless access points if the user ID is not validated. In another aspect, reselection component 1000 can be configured to facilitate idle mode reselection between the wireless access point and the other wireless access point based on, at least in part, the channel number, the scrambling code, and the at least one access restriction.

Figure 11:
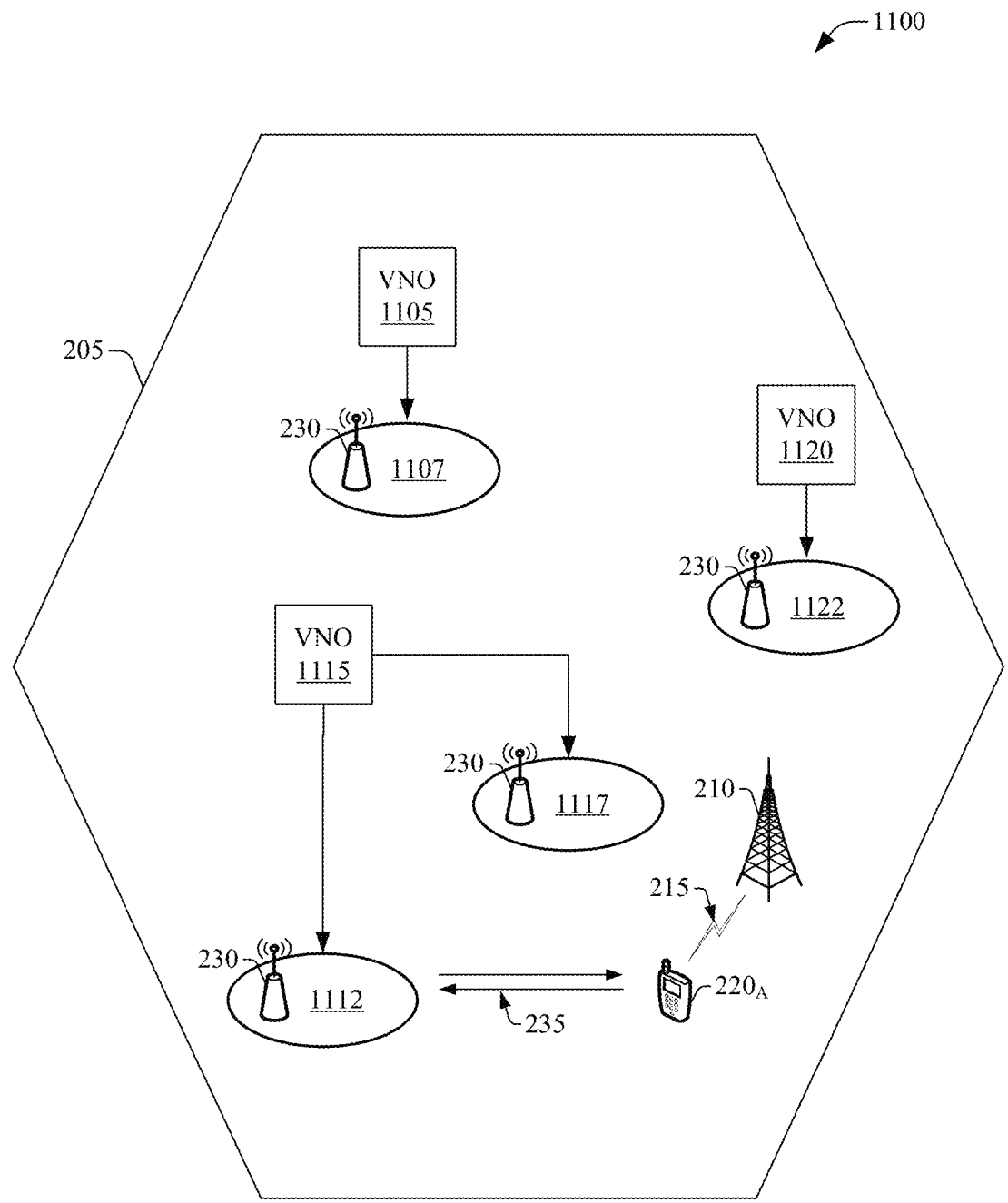
FIG. 11 illustrates a wireless environment that includes two femtocells referenced by a virtual neighbor object, in accordance with an embodiment.

For example, in an example wireless environment 1100 illustrated by FIG. 11, two femtocells (1112 and 1117) are associated with, or referenced by, virtual neighbor object 1115, which includes a channel number and a scrambling code. Further, femtocell 1112 can be associated with at least one access restriction defined by access restriction component 1010. Reselection component 620 can be configured to facilitate idle mode reselection from base station 210 to femtocell 1112 based on, at least in part, the channel number and scrambling code of virtual neighbor object 1115, and the at least one access restriction associated with femtocell 1112.

Figure 12:
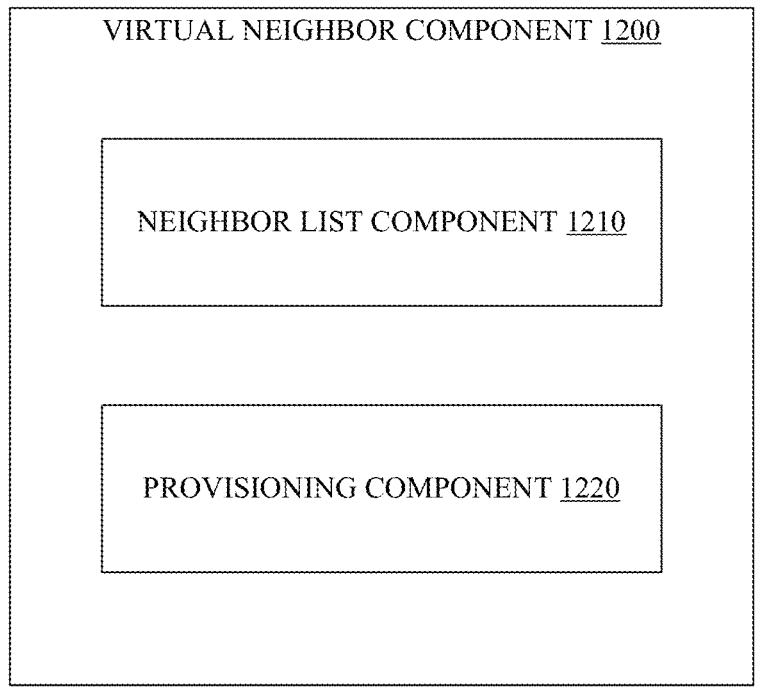
FIG. 12 illustrates a virtual neighbor component including a neighbor list component and a provisioning component, in accordance with an embodiment.
Figure 13:
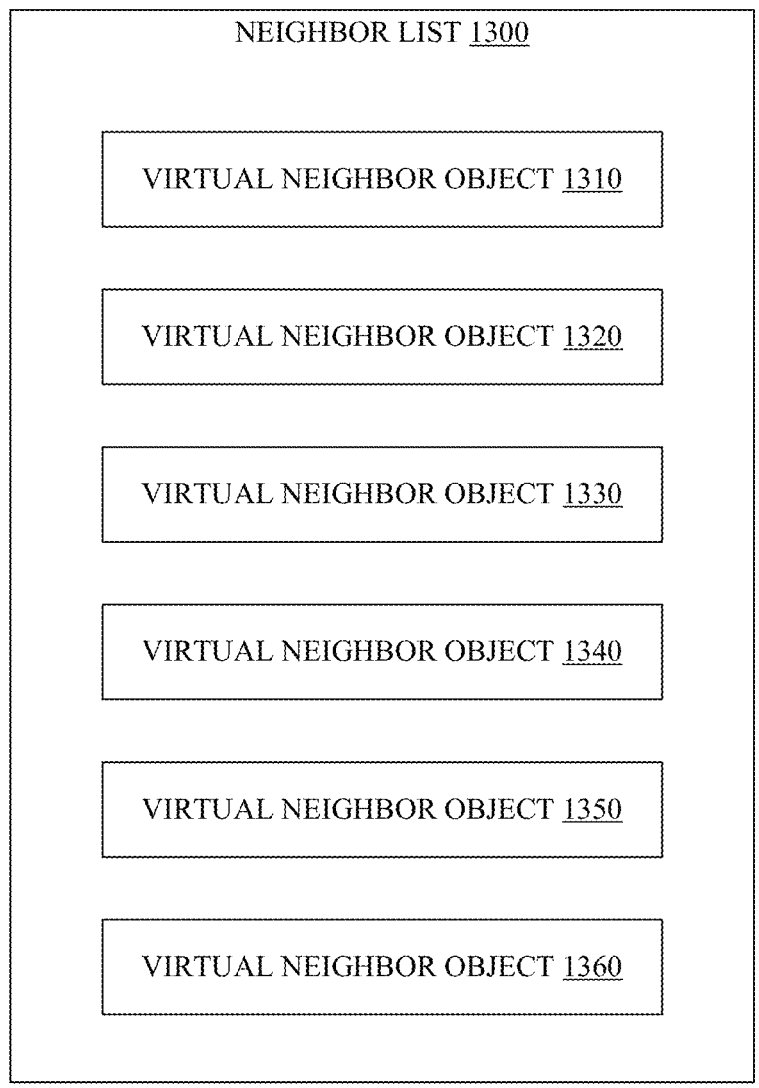
FIG. 13 illustrates a neighbor list including virtual neighbor objects, in accordance with an embodiment.

FIG. 12 illustrates a virtual neighbor component 1200 including a neighbor list component 1210 and a provisioning component 1220, in accordance with an embodiment. In relation to the discussion regarding FIG. 6 above, neighbor list component 1210 can be configured to construct a neighbor list (see FIG. 13) comprising the at least one virtual neighbor object. As illustrated by FIG. 13, in one embodiment, neighbor list 1300 can include six distinct virtual neighbor objects (1310, 1320, 1330, 1340, 1350, and 1360). Further, the at least one virtual neighbor object can include a channel number and a scrambling code (not shown). Moreover, provisioning component 1220 can be configured to transmit the neighbor list from the other wireless access point to a mobile wireless device, e.g., mobile wireless device 220$_A$, mobile wireless device 220$_B$. Reselection component 1210 can be configured to facilitate idle mode reselection between the wireless access point and the other wireless access point, via the mobile wireless device, based on, at least in part, the neighbor list, e.g., based on the channel number and the scrambling code associated with a virtual neighbor object included in the neighbor list.

Figure 14:
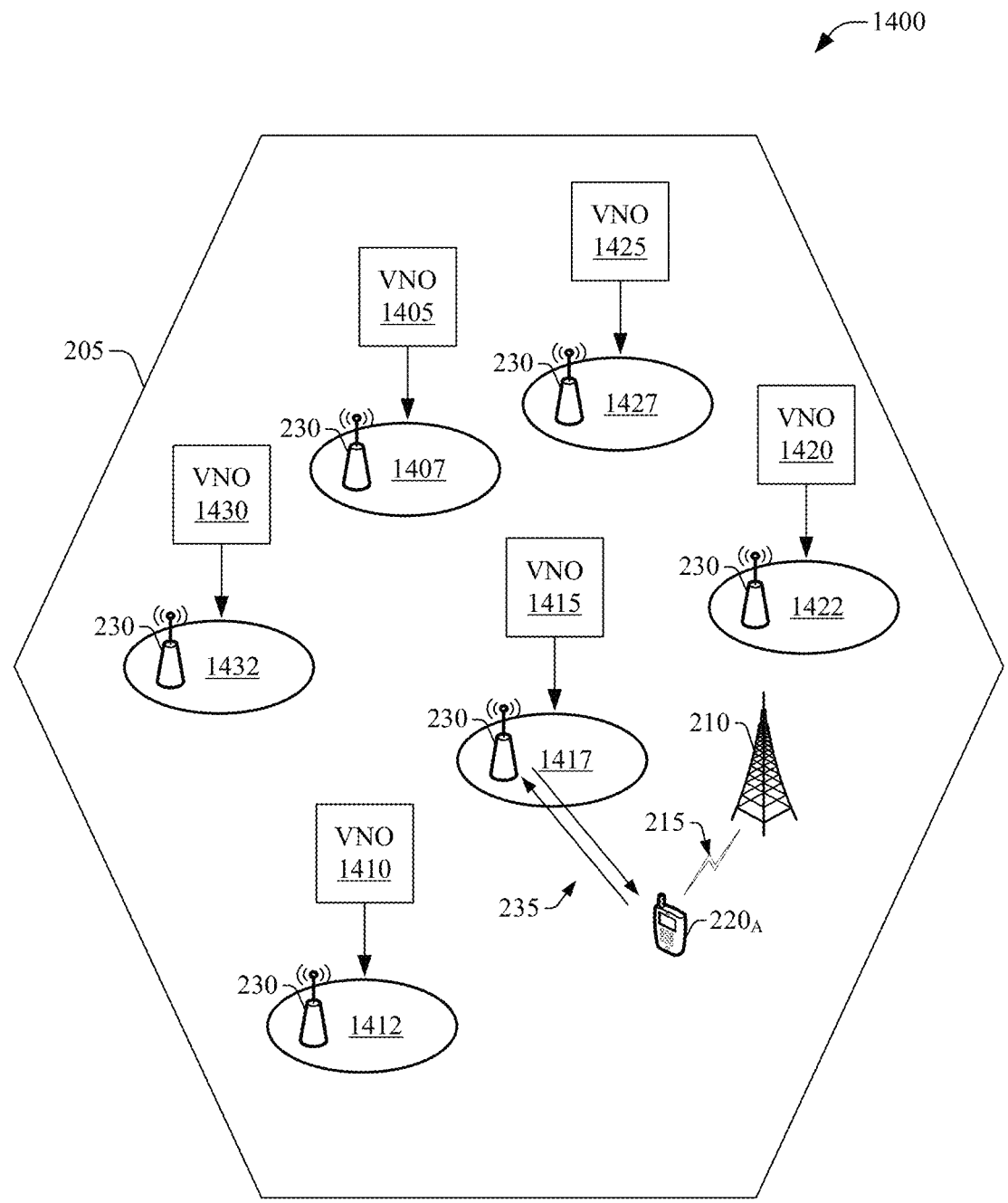
FIG. 14 illustrates a wireless environment associating six virtual neighbor objects to femtocells, in accordance with an embodiment.

For example, in an example wireless environment 1400 illustrated by FIG. 14, six different virtual neighbor objects (1405, 1410, 1415, 1420, 1425, 1430) comprising different combinations of channel numbers 810 and scrambling codes 820 can be associated with different femtocells (1407, 1412, 1417, 1422, 1427, 1432). Neighbor list component 1210 can be configured to construct a neighbor list (not shown) that includes the six different virtual neighbor objects (1405, 1410, 1415, 1420, 1425, and 1430). Provisioning component 1220 can be configured to transmit the neighbor list from base station 210 to mobile wireless device 220$_A$, via wireless link 215. Further, reselection component 1210 can be configured to facilitate idle mode reselection between femtocell 1417 and base station 210, via mobile wireless device 220$_A$, based on, at least in part, virtual neighbor object 1415 included in the neighbor list. It should be appreciated that neighbor list component can be configured to construct a neighbor list that includes more/less virtual neighbor objects. Moreover, as described below, it should be appreciated that at least one virtual neighbor object included in the neighbor list can reference more than one femtocell.

Figure 15:
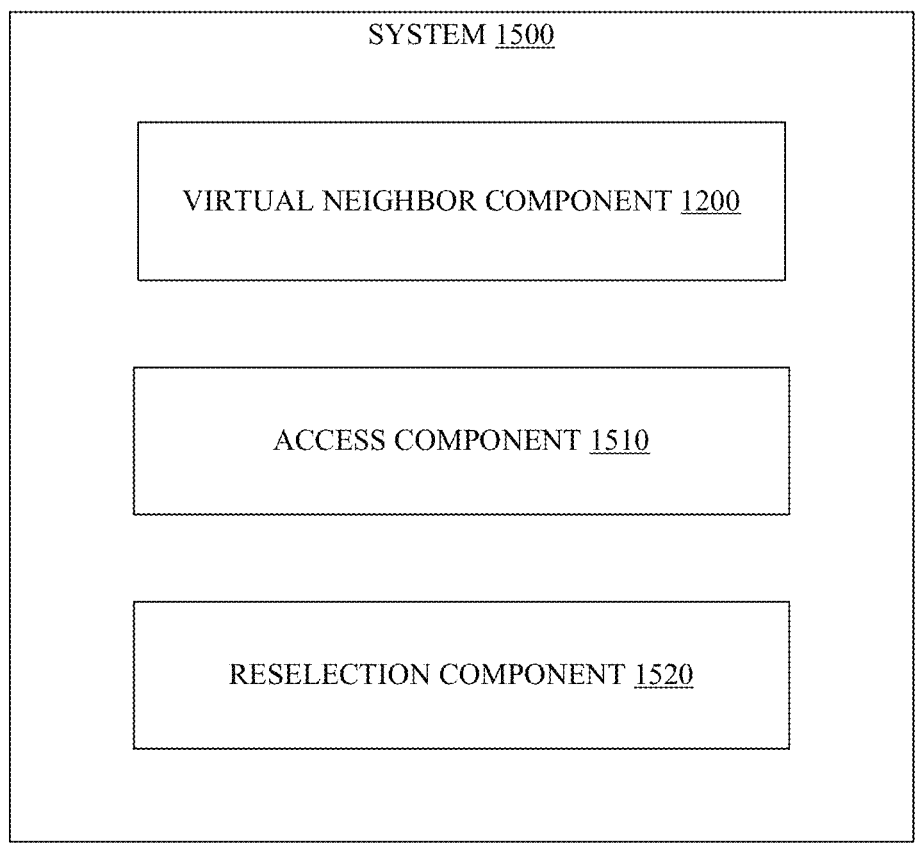
FIG. 15 illustrates a system that includes an access component for facilitating effective idle mode reselection, in accordance with an embodiment.

FIG. 15 illustrates a system 1500 that includes virtual neighbor component 1200 and an access component 1510, in accordance with an embodiment. In relation to the discussion regarding FIGS. 6 and 12 above, access component 1510 can be configured to assign at least one access control parameter to at least one access point of the at least two wireless access points. In one aspect, the at least one control parameter can relate to an ID associated with mobile wireless device $220_A$, e.g., the at least one control parameter can relate to an account associated with a wireless service provider. In another aspect, the at least one control parameter can be associated with an ACL (see above). In yet another aspect, the at least one access control parameter can relate to one or more signals associated with communication between mobile wireless device $220_A$ and one or more femtocells, e.g., the at least one access control parameter can relate to signal quality of the one or more signals.

Further, reselection component 1520 can be configured to facilitate idle mode reselection between the wireless access point and the other wireless access point based on, at least in part, the channel number, the scrambling code, and the at least one access control parameter. For example, in an example wireless environment 1600 illustrated by FIG. 16, six distinct virtual neighbor objects (1605, 1610, 1615, 1620, 1625, 1630) comprising different combinations of channel numbers 810 and scrambling codes 820 can be associated with different femtocells, e.g., 1607, 1612, etc. Neighbor list component 1210 can be configured to construct a neighbor list (not shown) that includes the six distinct virtual neighbor objects. Provisioning component 1220 can be configured to transmit the neighbor list from base station 210 to mobile wireless device $220_A$, via wireless link 215.

Figure 16:
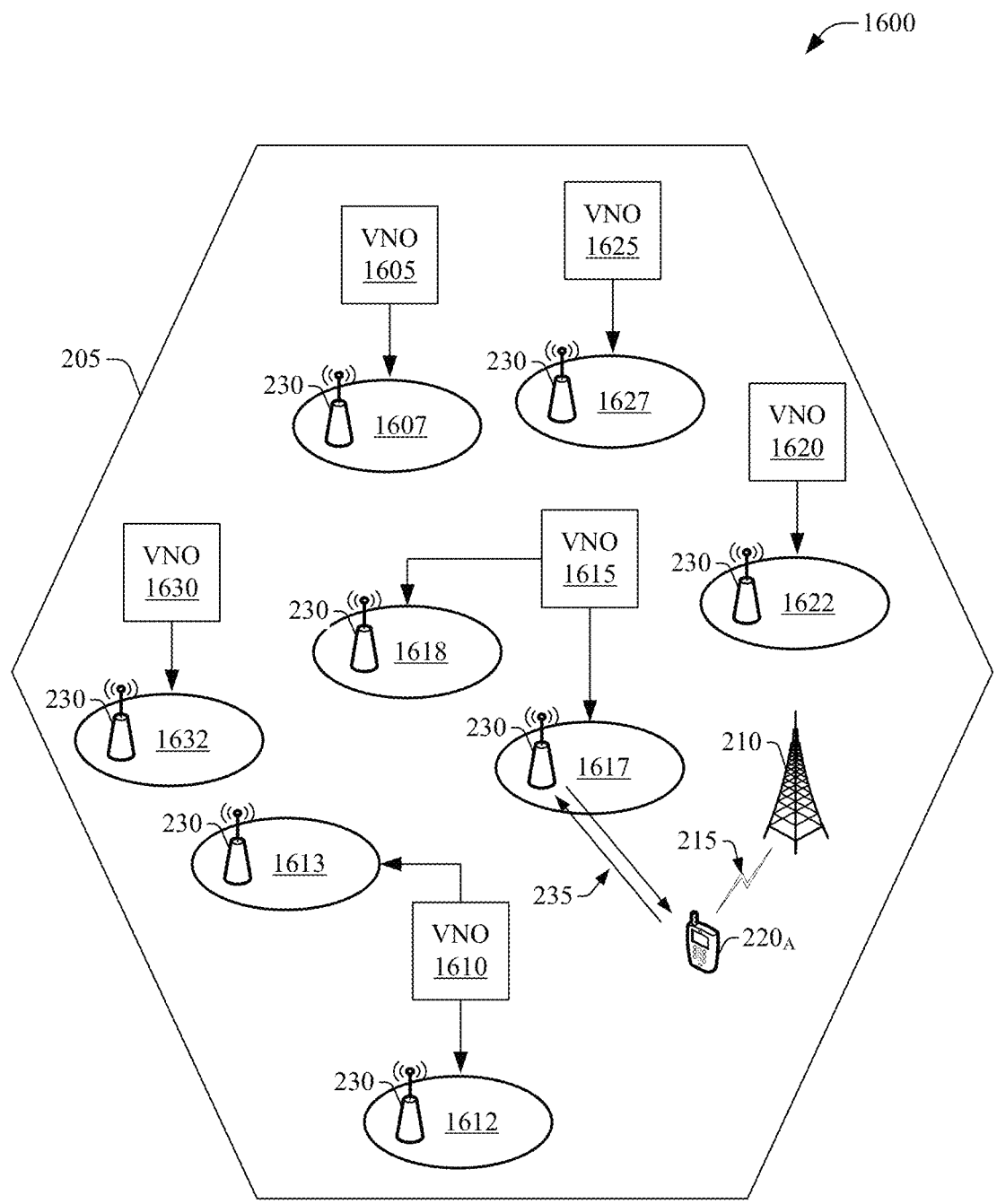
FIG. 16 illustrates a wireless environment associating multiple femtocells to a virtual neighbor object, in accordance with an embodiment.

As illustrated by FIG. 16, virtual neighbor object 1610 is associated with two femtocells (1612 and 1613). Moreover, virtual neighbor object 1615 is associated with two femtocells (1617 and 1618). Accordingly, reselection component 1520 can be configured to facilitate idle mode reselection between base station 210 and femtocell 1617, via mobile wireless device $220_A$, based on, at least in part, channel number 810, scrambling code 820, and at least one access control parameter assigned to one or more femtocells within wireless environment 1600 via access component 1510, e.g., at least one access control parameter assigned to femtocell 1617.

Figure 17:
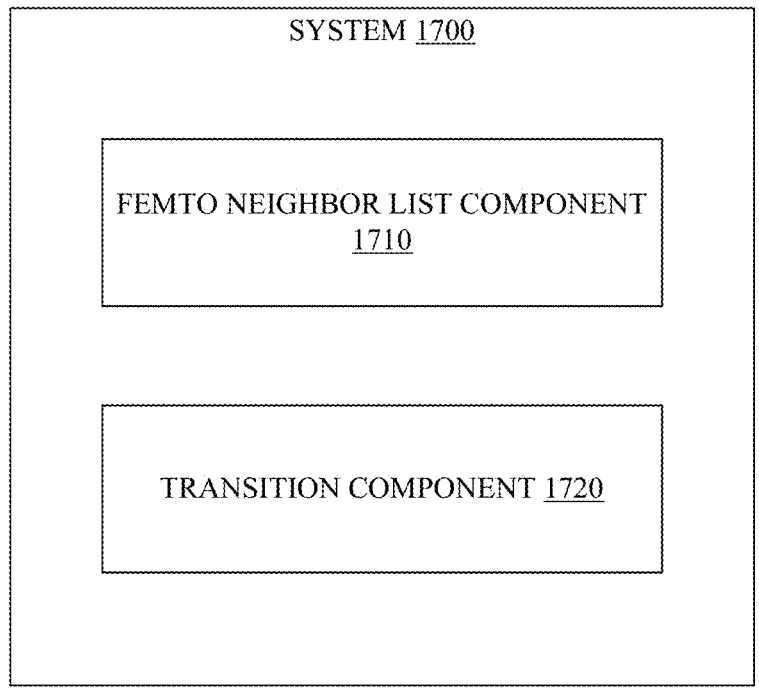
FIG. 17 illustrates a system that includes a femto neighbor list component and a transition component, in accordance with an embodiment.

FIG. 17 illustrates a system 1700 that includes a femto neighbor list component 1710 and a transition component 1720, in accordance with an embodiment. Femto neighbor list component 1710 can be configured to reference at least two femtocells associated with macro cells using a virtual neighbor object of a plurality of virtual neighbor objects. Further, femto neighbor list component 1710 can be configured to build a femtocell neighbor list comprising the plurality of virtual neighbor objects. Transition component 1720 can be configured to transmit the femtocell neighbor list from base stations associated with the macro cells to mobile wireless devices. Moreover, transition component 1720 can be configured to facilitate selection of a femtocell of the at least two femtocells via at least one of the mobile wireless devices based on, at least in part, the femtocell neighbor list.

Figure 18:
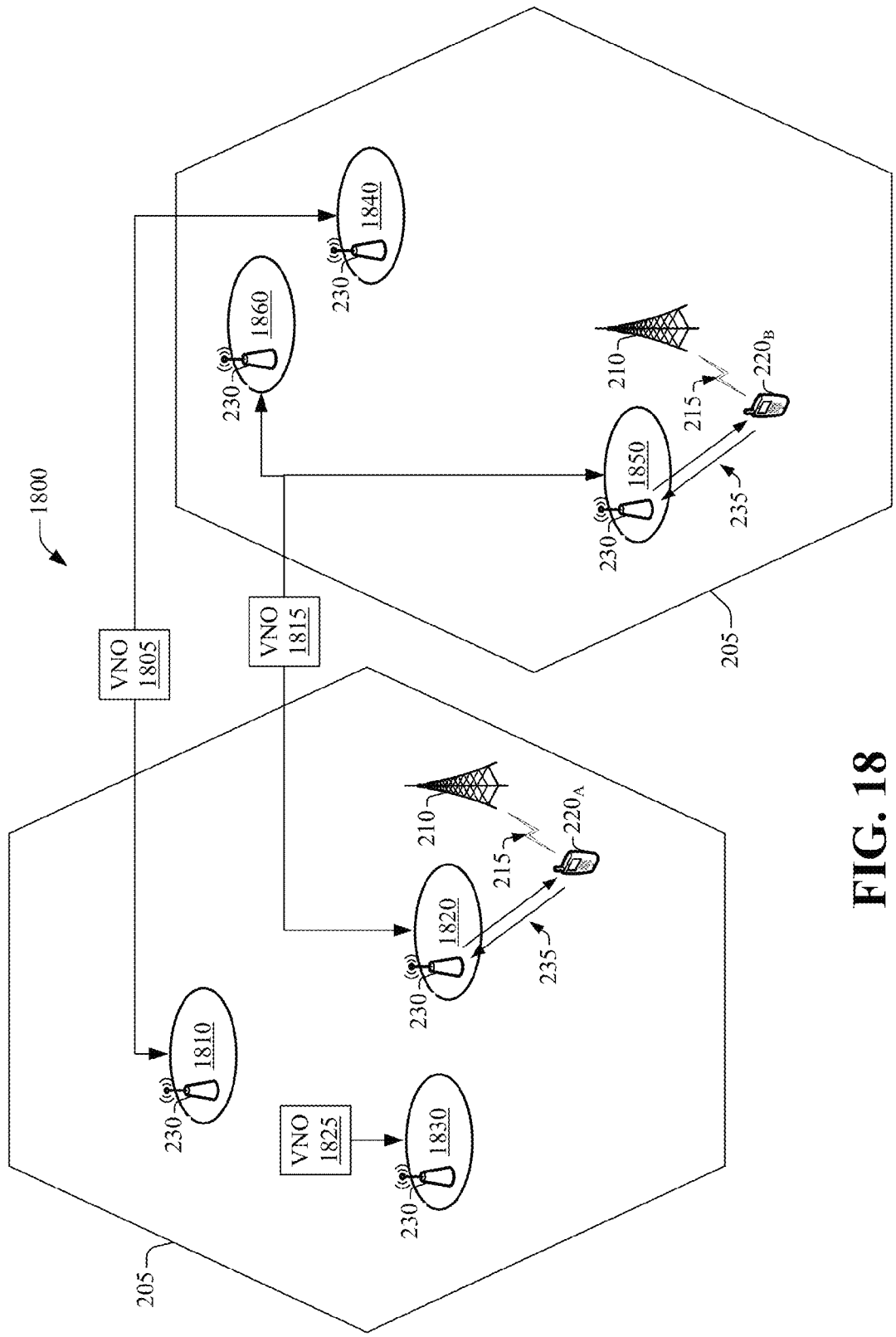
FIG. 18 illustrates another wireless environment associating multiple femtocells to a virtual neighbor object, in accordance with an embodiment.

In an example wireless environment 1800 illustrated by FIG. 18, femto neighbor list component 1710 references femtocells 1810 and 1840 via virtual neighbor object 1805; references femtocells 1820, 1850, and 1860 via virtual neighbor object 1815; and references femtocell 1830 via virtual neighbor object 1825. Femto neighbor list component 1710 can include virtual neighbor objects 1805, 1815, and 1825 in a femto neighbor list (not shown). Transition component 1720 can transmit the femtocell neighbor list from base stations 210 to mobile wireless devices $220_A$ and $220_B$, which can facilitate reselection to femtocells 1820 and 1850 from base stations 210 via mobile wireless devices $220_A$ and $220_B$, respectively.

As described above, a mobile wireless device, e.g., mobile wireless device $220_A/220_B$, can monitor one or more control and/or broadcast channels of base stations for selecting one of the base stations to service an incoming/outgoing call in active mode. Accordingly, in one aspect, transition component 1720 can transmit the femtocell neighbor list from base stations 210 to mobile wireless devices $220_A$ and $220_B$ via at least one of a System Information Block (SIB) message or a quater message.

A SIB message, or measurement control message, can be transmitted from a base station, e.g., node B 540, associated with a UTRAN, e.g., UTRAN 520. A quater message can contain measurement control information transmitted from a base station, e.g., BTS 440, associated with a BSS, e.g., BSS 420. The SIB and/or quater message can describe parameters of an associated base station, which a mobile wireless device can use for monitoring the base station, e.g., to determine base station signal quality. Mobile wireless devices $220_A$ and $220_B$ can receive the SIB and/or quater message and extract the femtocell neighbor list from the SIB and/or quater message. Each mobile wireless device $220_A/220_B$ can attempt to monitor, or scan, femtocells associated with virtual neighbor object entries included in the femtocell neighbor list, e.g., via channel numbers and scrambling codes associated with each virtual neighbor object entry.

As illustrated by FIG. 18, one or more virtual neighbor objects included in a femtocell neighbor list can reference at least two femtocells, e.g., VNO 1815 included in a femtocell neighbor list transmitted to mobile wireless device $220_B$— VNO referencing femtocells 1850 and 1860. Accordingly, in an aspect, one or more access control lists can be associated with one or more of the at least two femtocells described above regarding FIG. 17. Moreover, and referring to the discussion above regarding FIG. 17, transition component 1720 can be configured to facilitate selection of a femtocell of the at least two femtocells via at least one of the mobile wireless devices based on, at least in part, the femtocell neighbor list and one or more access control lists, the one or more access control lists associated with one or more of the at least two femtocells.

For example, an access control list can be associated with femtocells 1850 and 1860, and transition component 1720 can be configured to facilitate selection of femtocell 1850 via mobile wireless device $220_B$ based on an access control list related to femtocell 1850, e.g., the access control list granting access based on one or more parameters associated with mobile wireless device $220_B$, such as account information, mobile wireless device identification, etc.

It should be appreciated that although virtual neighbor object 1805 references two femtocells (1810 and 1840) associated with different macro cells 205, a femtocell neighbor list transmitted to mobile wireless device $220_A$ does not include a virtual neighbor object that references at least two femtocells located within macro cell 205 associated with mobile wireless device $220_A$. Accordingly, transition component 1720 can facilitate reselection to femtocell 1810 from base station 210 via mobile wireless device $220_A$ without considering access control list restrictions.

FIGS. 19-23 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 19:
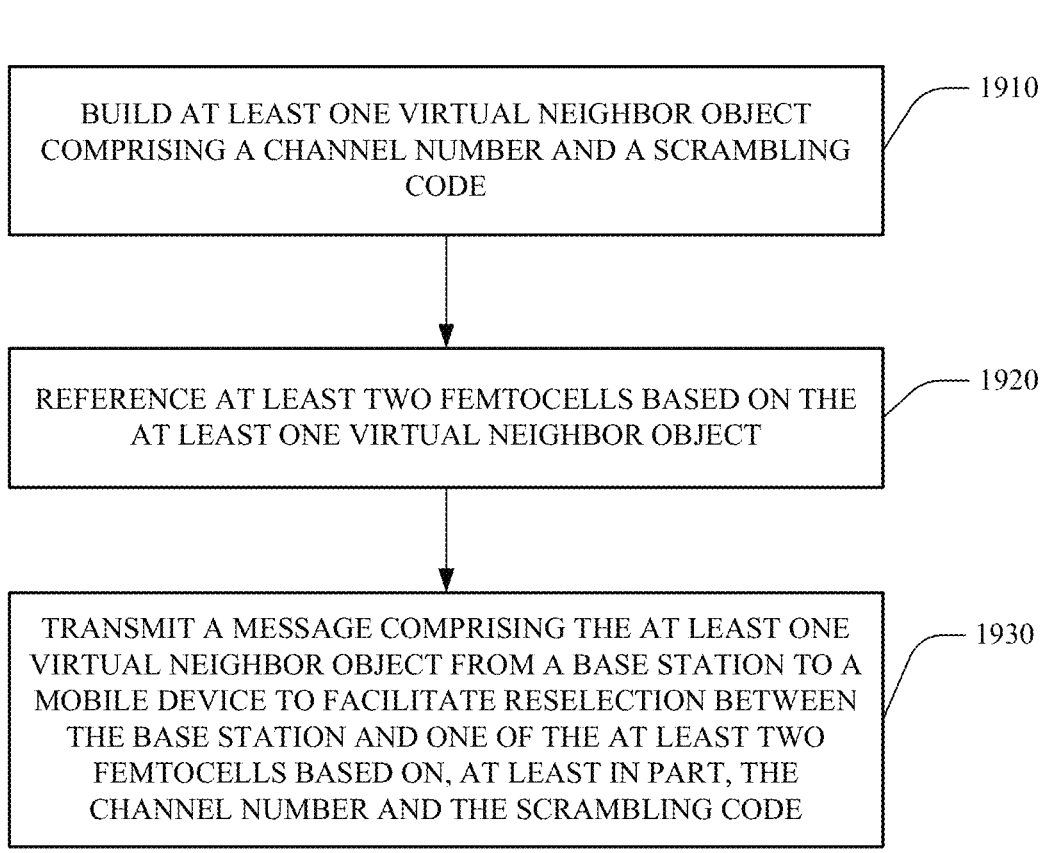
FIG. 19 illustrates a process that provides for effective idle mode reselection in a wireless environment, in accordance with an embodiment.
Figure 20:
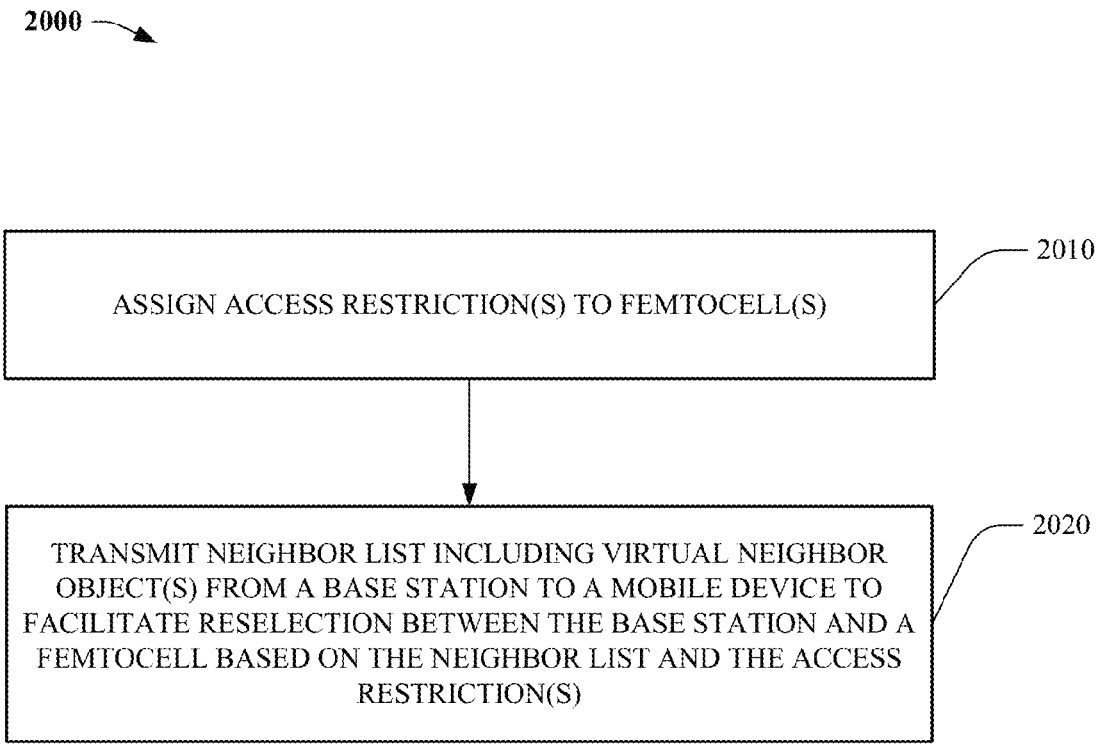
FIG. 20 illustrates another process that provides for effective idle mode reselection in a wireless environment, in accordance with an embodiment.

Referring now to FIGS. 19 and 20, processes 1900 and 2000 that provide for effective idle mode reselection in a wireless environment are illustrated, in accordance with an embodiment. At 1910, at least one virtual neighbor object comprising a channel number and a scrambling code can be built/created. In an aspect, the channel number and the scrambling code can be associated with one or more femtocells located within a coverage area, or macro cell, of a base station. At 1920, the at least one virtual neighbor object can reference at least two femtocells, e.g., within the macro cell and/or across different macro cells. A message including the at least one virtual neighbor object, e.g., comprising neighbor list, can be transmitted from a base station to a mobile wireless device at 1930. In an aspect, the message can include a System Information Block (SIB) message or a quater message (see above). Further, an idle mode reselection can be facilitated between the base station and one of the at least two femtocells via the mobile wireless device, based on, at least in part, the channel number and the scrambling code associated with the femtocell.

Regarding example process 2000 illustrated by FIG. 20, one or more access restrictions can be assigned to one or more femtocells at 2010. For example, the one or more access restrictions can comprise an ID associated with a mobile wireless device that is enabled access to a femtocell, e.g., based on the ID matching the one or more access restrictions. In an aspect, the ID can include a user ID associated with the mobile wireless device, or an account number affiliated with a wireless service provider. At 2020, reselection component can facilitate idle mode reselection between the base station and one of the at least two femtocells via the mobile wireless device, based on, at least in part, the channel number, the scrambling code, and the one or more access restrictions. Returning now to the example above, the one or more access restrictions can prevent access/prevent reselection to the femtocell if the user ID and/or account number associated with the mobile wireless device is not validated.

Figure 21:
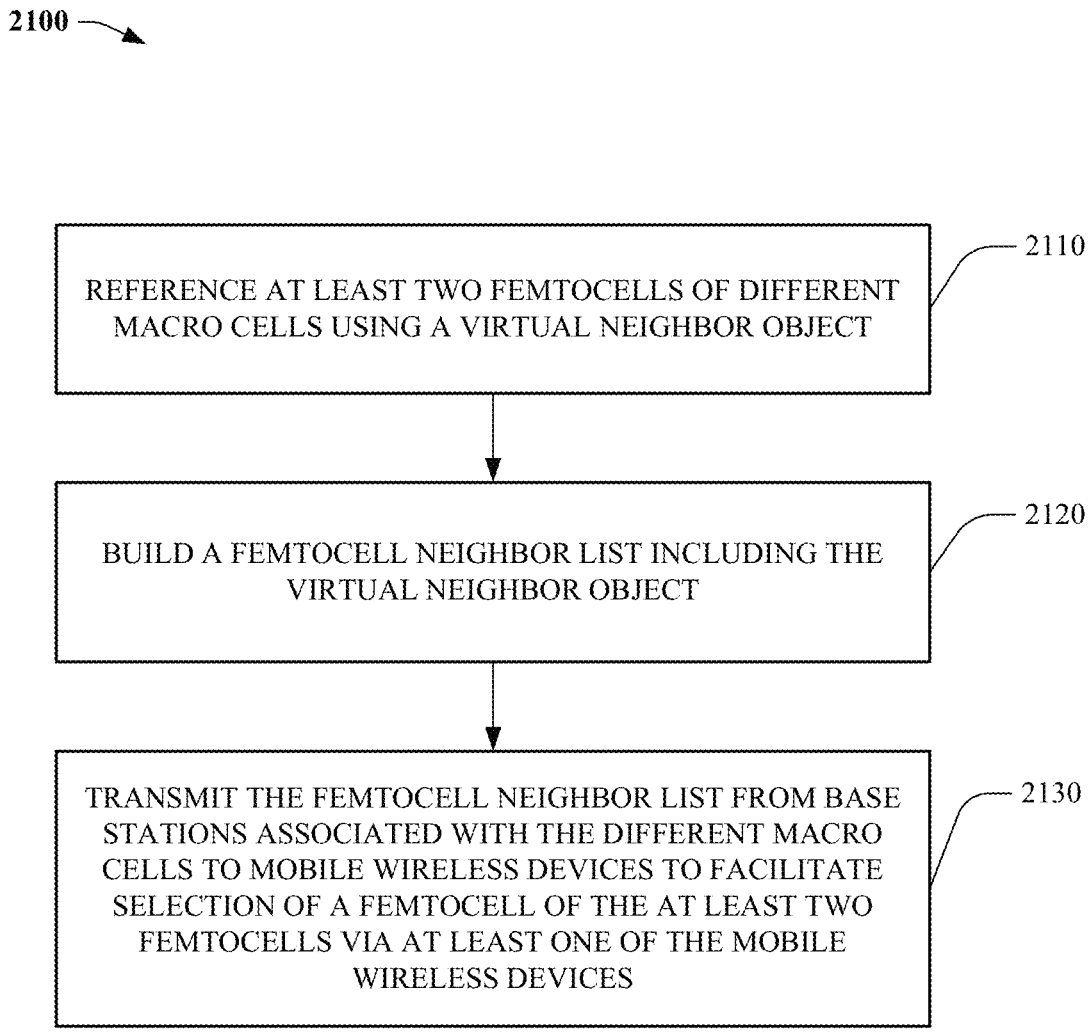
FIG. 21 illustrates yet another process that provides for effective idle mode reselection in a wireless environment, in accordance with an embodiment.

FIG. 21 illustrates a process 2100 that provides for effective idle mode reselection in a wireless environment, in accordance with an embodiment. At 2110, at least two femtocells of different macro cells—the macro cells associated with a UMTS network and/or a GSM network—can be referenced by a virtual neighbor object of a plurality of virtual neighbor objects. A femtocell neighbor list can be constructed to include the plurality of virtual neighbor objects at 2120. At 2130, the femtocell neighbor list can be transmitted from base stations of the different macro cells to mobile wireless devices. Further, reselection from one of the base stations to a femtocell of the at least two femtocells can be performed via one of the mobile wireless devices at 2130.

Figure 22:
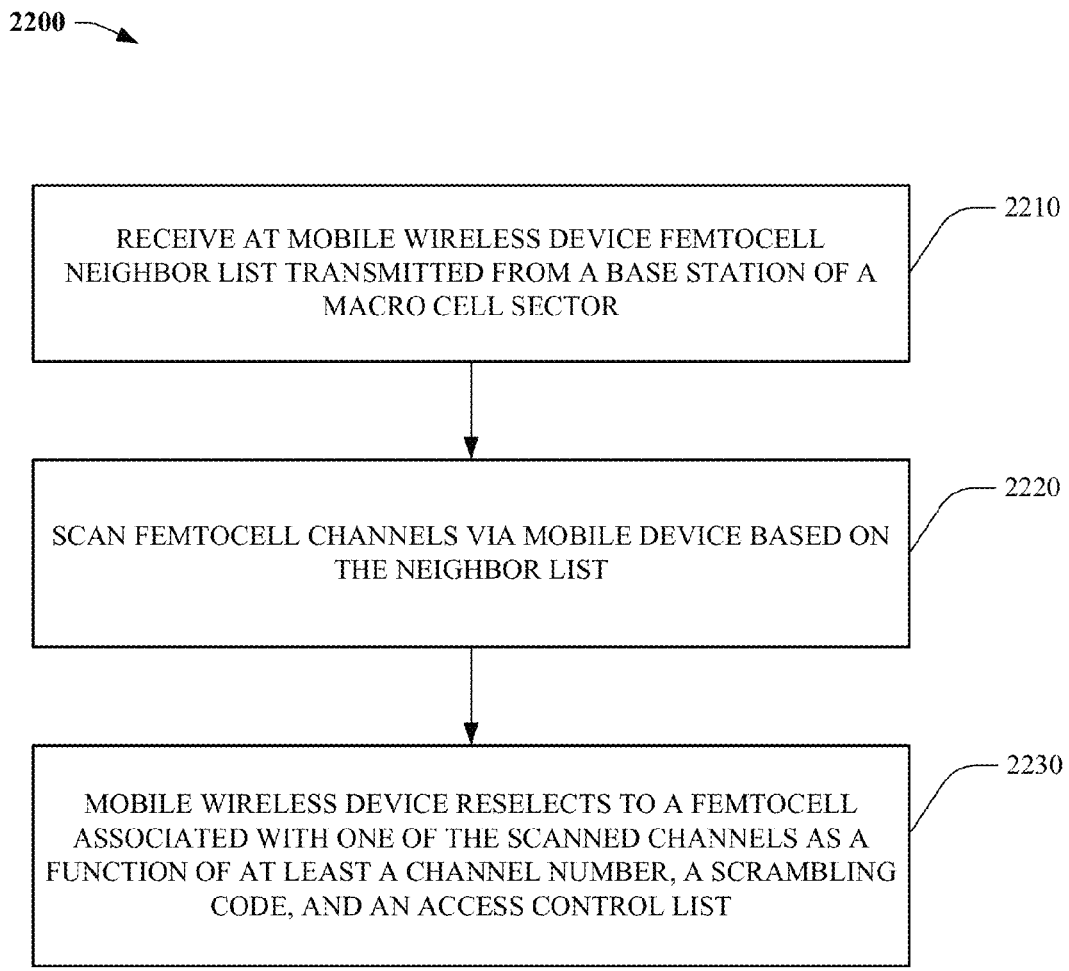
FIG. 22 illustrates a process associated with a mobile wireless device, in accordance with an embodiment.

Referring now to FIG. 22, a process 2200 associated with a mobile device is illustrated, in accordance with an embodiment. At 2210, a mobile wireless device can receive a femtocell neighbor list transmitted from a base station of a macro cell sector. The mobile wireless device can scan femtocell channels at 2220—each channel associated with a channel number and a scrambling code related to a virtual neighbor object included in the femtocell neighbor list. At 2230, the mobile wireless device can reselect to a femtocell associated with the scanned femtocell channels based on, at least in part, a channel number, a scrambling code, and an access control list related to the femtocell. The access control list can grant access to the femtocell based on one or more parameters associated with the mobile wireless device, such as account information, mobile wireless device identification, etc.

Figure 23:
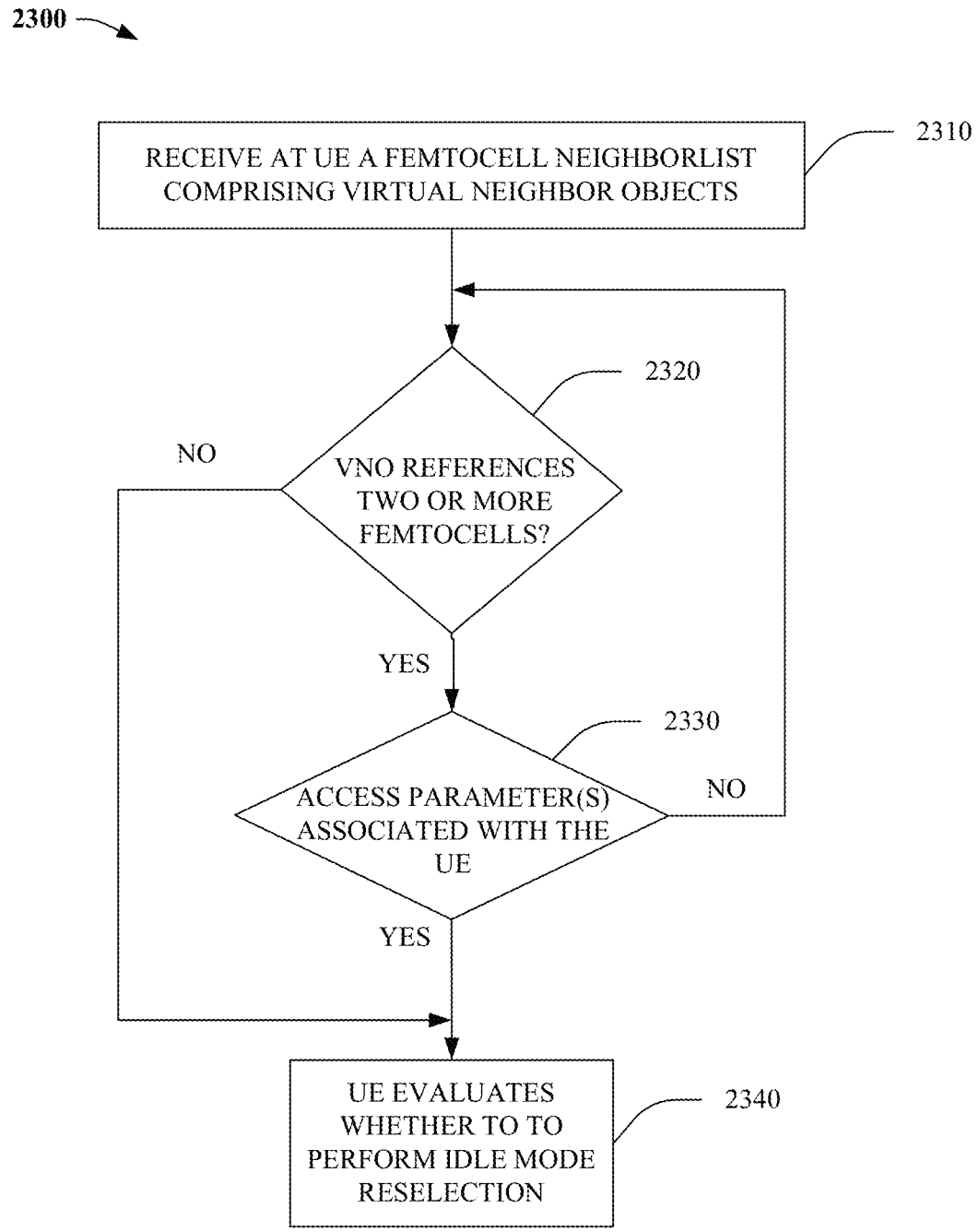
FIG. 23 illustrates another process associated with a mobile wireless device, in accordance with an embodiment.

FIG. 23 illustrates another process (2300) associated with a mobile device, in accordance with an embodiment. A mobile wireless device, e.g., UE, can receive a femtocell neighbor list including virtual neighbor objects transmitted from a base station at 2310. At 2320, the mobile wireless device can determine, for each virtual neighbor object included in the femtocell neighbor list, whether the virtual neighbor object references two or more femtocells—the two or more femtocells communicating with/sending information to the mobile wireless device. If it is determined that the virtual neighbor object does not reference two or more femtocells, flow continues to 2340, at which the mobile wireless device can scan a femtocell associated with a channel number and scrambling code included in the virtual neighbor object, e.g., to evaluate whether to select the femtocell to service an active communication.

If it is determined at 2320 that the virtual neighbor object references two or more femtocells communicating with/sending information to the mobile wireless device, then it can be determined at 2330, e.g., via a femtocell associated with the virtual neighbor object, whether one or more access parameters related to the femtocell correlate with the mobile wireless device. If it is determined that the one or more access parameters correlate with the mobile wireless device, then flow continues to 2340 (see above); however, if it is determined that the one or more access parameters do not correlate with the mobile wireless device, then flow returns to 2320, at which the mobile wireless device can determine whether another virtual neighbor object included in the femtocell neighbor list references two or more femtocells.

Figure 24:
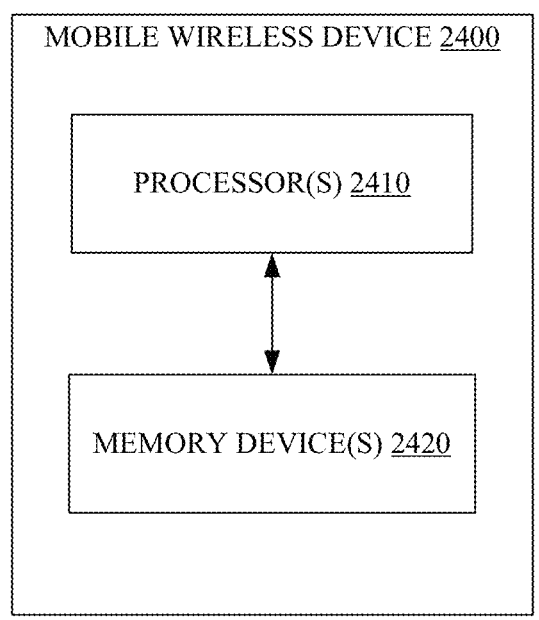
FIG. 24 illustrates a block diagram of a mobile wireless device, in accordance with an embodiment.

FIG. 24 illustrates a block diagram of a mobile wireless device 2400, in accordance with an embodiment. Mobile wireless device 2400 can perform the acts described above related to, e.g., mobile wireless devices $220_A$ and $220_B$; mobile stations $450_A$ and $450_B$; user equipment $550_A$ and $550_B$. For example, mobile wireless device 2400 can perform acts described with respect to FIGS. 22 and 23 via processor(s) 2410. Processors(s) 2410 can perform such acts within the mobile wireless device utilizing, e.g., memory device(s) 2420.

Figure 25:
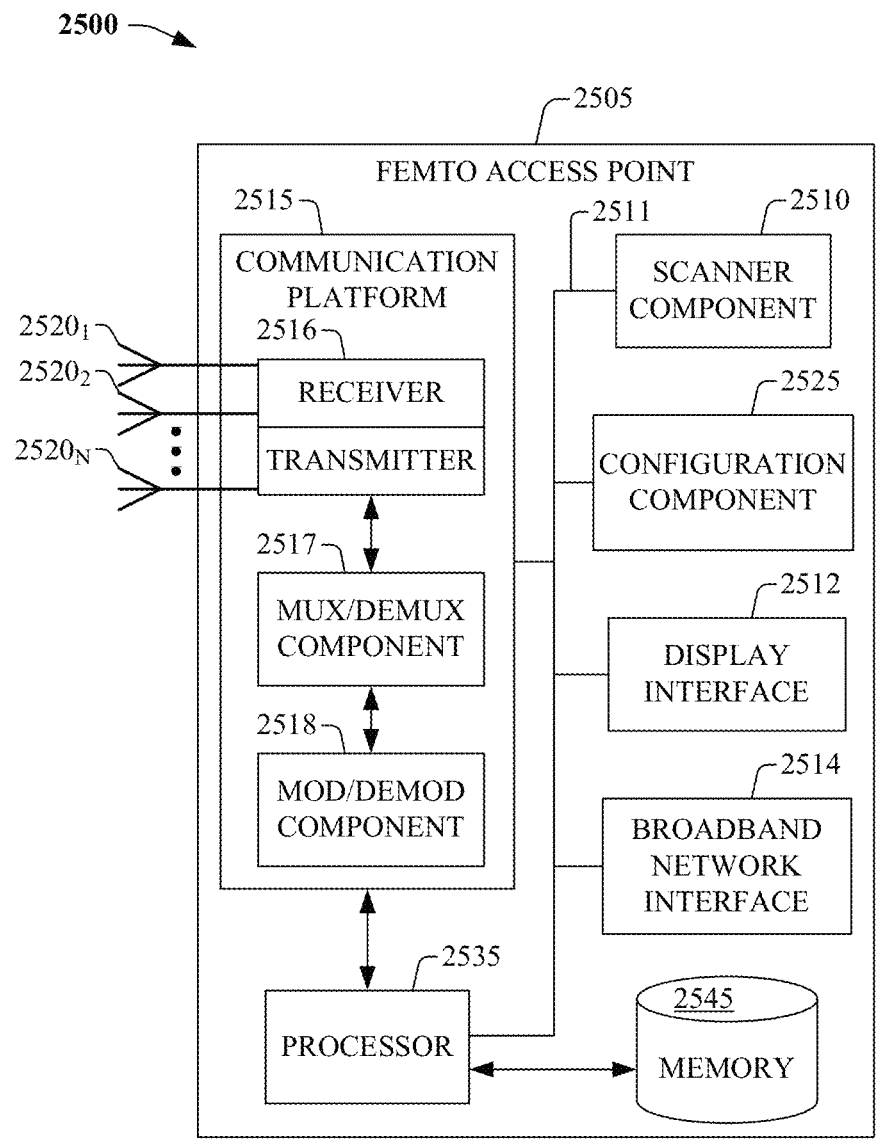
FIG. 25 illustrates a block diagram of a femto access point, in accordance with an embodiment.
Figure 26:
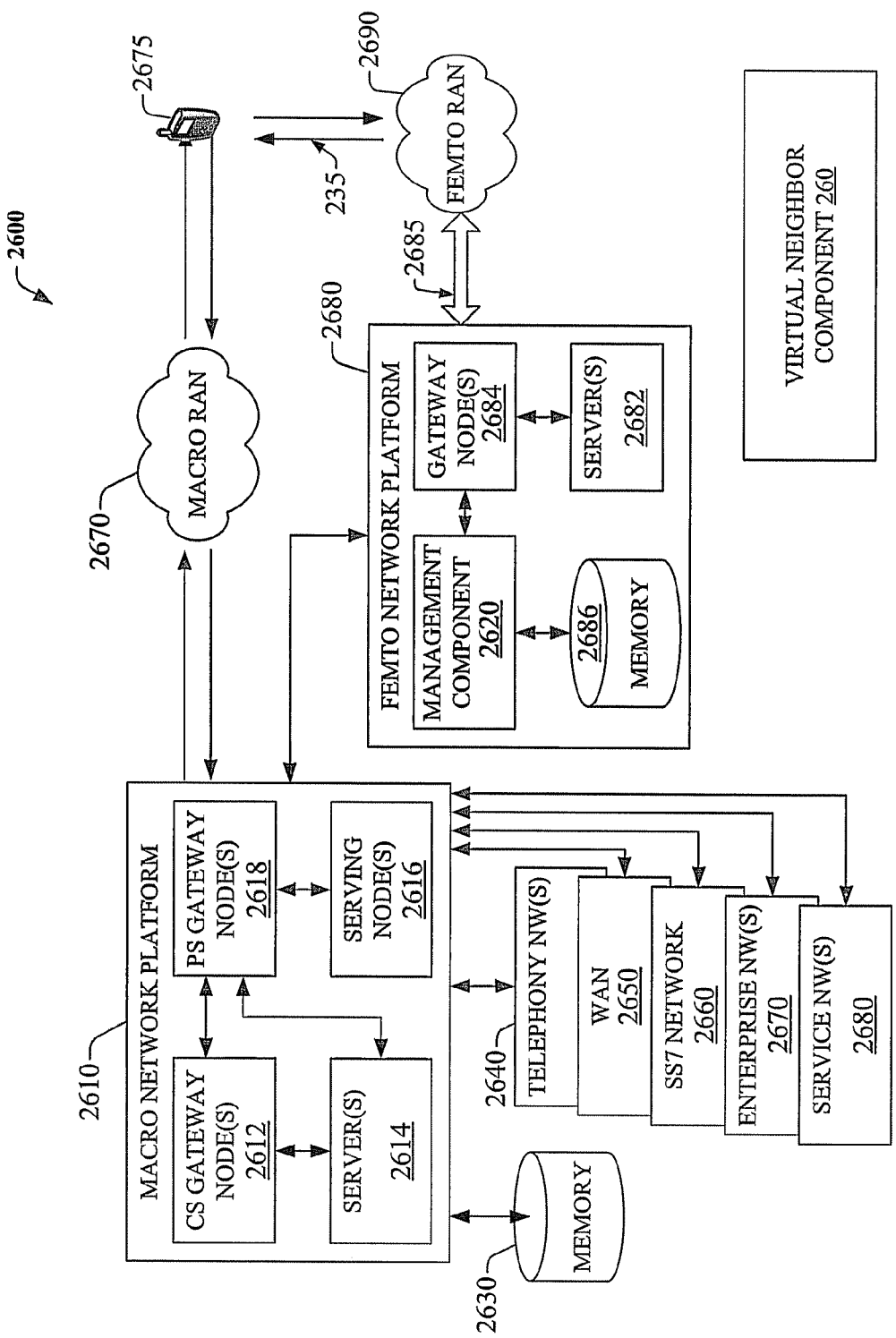
FIG. 26 illustrates a block diagram of a wireless network environment, in accordance with an embodiment.

To provide further context for various aspects of the disclosed subject matter, FIGS. 25 and 26 illustrate, respectively, a block diagram of an embodiment 2500 of a femtocell access point 2505 that can enable or exploit features and/or aspects of the disclosed subject matter; and a wireless network environment 2600 that includes femto and macro network platforms, which can enable aspects or feature of a mobile network platform as described herein, and utilize femto APs that exploit aspects of the subject innovation in accordance with various aspects of the subject specification. In embodiment 2500, femto AP 2505 can receive and transmit signal(s) from and to wireless devices, e.g., femto access points, access terminals, wireless ports and routers, or the like, through a set of antennas $2520_1$-$2520_N$ (N is a positive integer). Antennas $2520_1$-$2520_N$ are a part of communication platform 2515, which comprises electronic components and associated circuitry that provides for processing and manipulation of received signal(s) and signal(s) to be transmitted.

In an aspect, communication platform 2515 includes a receiver/transmitter 2516 that can convert analog signals to digital signals upon reception of the analog signals, and convert digital signals to analog signals upon transmission. In addition, receiver/transmitter 2516 can divide a single data stream into multiple, parallel data streams, or perform the reciprocal operation. Coupled to receiver/transmitter 2516 is a multiplexer/demultiplexer 2517 that facilitates manipulation of signal in time and frequency space. Electronic component 2517 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 2517 can scramble and spread information (e.g., codes) according to substantially any code known in the art, e.g., Hadamard-Walsh codes, Baker codes, Kasami codes, polyphase codes, etc. A modulator/demodulator 2518 is also a part of communication platform 2515, and can modulate information according to multiple modulation techniques, such as frequency modulation, amplitude modulation, e.g., M-ary quadrature amplitude modulation (QAM), with M a positive integer), phase-shift keying (PSK), etc.

Femto access point 2505 also includes a processor 2535 configured to confer, at least in part, functionality to substantially any electronic component in femto AP 2505. In particular, processor 2535 can facilitate configuration of femto AP 2505 via system 600, and one or more component therein. Additionally, femto AP 2505 includes display interface 2512, which can display functions that control functionality of femto AP 2505, or reveal operation conditions thereof. In addition, display interface 2512 can include a screen to convey information to an end user. In an aspect, display interface 2512 can be a liquid crystal display (LCD), a plasma panel, a monolithic thin-film based electrochromic display, and so on. Moreover, display interface can also include a component, e.g., speaker that facilitates communication of aural indicia, which can also be employed in connection with messages that convey operational instructions to an end user. Display interface 2512 also facilitates data entry e.g., through a linked keypad or via touch gestures, which can facilitated femto AP 2505 to receive external commands, e.g., restart operation.

Broadband network interface facilitates connection of femto AP 2505 to femto network via access point backhaul link(s) 253 (not shown in FIG. 25), which enable incoming and outgoing data flow. Broadband network interface 2514 can be internal or external to femto AP 2505, and it can utilize display interface 2512 for end-user interaction and status information delivery.

Processor 2535 also is functionally connected to communication platform 2515 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 2535 is functionally connected, via data, system, or address bus 2511, to display interface 2512 and broadband network interface 2514 to confer, at least in part functionality to each of such components.

In femto AP 2505, memory 2545 can retain location and/or home macro sector identifier(s); access list(s) that authorize access to wireless coverage through femto 2505; sector intelligence that includes ranking of macro sectors in the macro wireless environment of femto AP 2505, radio link quality and strength associated therewith, or the like. Memory 2545 also can store data structures, code instructions and program modules, system or device information, code sequences for scrambling, spreading and pilot transmission, femto AP floor plan configuration, and so on. Processor 2535 is coupled, e.g., via a memory bus, to memory 2545 in order to store and retrieve information necessary to operate and/or confer functionality to the components, platform, and interfaces that reside within femto access point 2505.

Now referring to FIG. 26, wireless communication environment 2600 includes two wireless network platforms: (1) macro network platform 2610 that serves, or facilitates communication with, user equipment (UE) 2675, e.g., mobile wireless device 2400, via a macro radio access network (RAN) 2670; and (2) femto network platform 2680, which can provide communication with UE 2675 through a femto RAN 2690, which is linked to femto network platform 2680 via backhaul pipe(s) 2685, e.g., access point backhaul link(s) 253. Moreover, wireless communication environment 2600 includes virtual neighbor component 260. It should be appreciated that wireless communication environment 2600 can include aspects and/or components of the subject innovation discussed above regarding, e.g., system 600, virtual neighbor component 1200, system 1500, system 1700, etc. Moreover, such aspects and/or components can be located/included within one or more components/elements, e.g., hardware, software, etc., of wireless communication environment 2600, e.g., macro network platform 2610, radio network 2690, and/or mobile device 2695.

It should also be appreciated that in cellular wireless technologies, e.g., 3GPP UMTS, HSPA, 3GPP LTE™, 3GPP2 UMB, GSM, etc., macro network platform 2610 is embodied in a core network. It should also be appreciated that macro network platform 2610 typically hands off UE 2675 to femto network platform 2610 once UE 2675 attaches, e.g., through macro-to-femto handover, to femto RAN 2690, which includes a set of deployed femto APs, e.g., femto AP 230, which can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 2670 can comprise various coverage cells like macro cell 205, while femto RAN 2690 can comprise multiple femtocell access points such as femto AP 230. Deployment density in femto RAN 2690 is substantially higher than in macro RAN 2670.

Generally, both macro and femto network platforms 2610 and 2680 include components, e.g., nodes, gateways, interfaces, servers, or platforms, that facilitate both packet-switched (PS), e.g., internet protocol (IP), frame relay, asynchronous transfer mode (ATM), and circuit-switched (CS) traffic, e.g., voice and data, and control generation for networked wireless communication. In an aspect of the subject innovation, macro network platform 2610 includes CS gateway node(s) 2612 which can interface CS traffic received from legacy networks like telephony network(s) 2640, e.g., public switched telephone network (PSTN), or public land mobile network (PLMN), or a SS7 network 2660. Circuit switched gateway 2612 can authorize and authenticate traffic, e.g., voice, arising from such networks. Additionally, CS gateway 2612 can access mobility, or roaming, data generated through SS7 network 2660; for instance, mobility data stored in a VLR, which can reside in memory 2630. Moreover, CS gateway node(s) 2612 interfaces CS-based traffic and signaling and gateway node(s) 2618. As an example, in a 3GPP UMTS network, PS gateway node(s) 2618 can be embodied in gateway GPRS support node(s) (GGSN).

In addition to receiving and processing CS-switched traffic and signaling, PS gateway node(s) 2618 can authorize and authenticate PS-based data sessions with served, e.g., through macro RAN, wireless devices. Data sessions can include traffic exchange with networks external to the macro network platform 2610, like wide area network(s) (WANs) 2650; enterprise networks (NWs) 2670, e.g., enhanced 911, or service NW(s) 2680 like IP multimedia subsystem (IMS). It should be appreciated that local area network(s) (LANs), which may be a part of enterprise NW(s), can also be interfaced with macro network platform 2610 through PS gateway node(s) 2618. Packet-switched gateway node(s) 2618 generates packet data contexts when a data session is established. To that end, in an aspect, PS gateway node(s) 2618 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 2614. It is to be noted that in 3GPP UMTS network(s), PS gateway node(s) 2618 (e.g., GGSN) and tunnel interface (e.g., TTG) comprise a packet data gateway (PDG).

Macro network platform 2610 also includes serving node(s) 2616 that convey the various packetized flows of information, or data streams, received through PS gateway node(s) 2618. As an example, in a 3GPP UMTS network, serving node(s) can be embodied in serving GPRS support node(s) (SGSN).

As indicated above, server(s) 2614 in macro network platform 2610 can execute numerous applications, e.g., location services, online gaming, wireless banking, wireless device management, etc. that generate multiple disparate packetized data streams or flows, and manage such flows, e.g., schedule, queue, format. Such application(s), for example can include add-on features to standard services provided by macro network platform 2610. Data streams can be conveyed to PS gateway node(s) 2618 for authorization/authentication and initiation of a data session, and to serving node(s) 2616 for communication thereafter. Server(s) 2614 can also effect security, e.g., implement one or more firewalls, of macro network platform 2610 to ensure network's operation and data integrity in addition to authorization and authentication procedures that CS gateway node(s) 2612 and PS gateway node(s) 2618 can enact. Moreover, server(s) 2614 can provision services from external network(s), e.g., WAN 2650, or Global Positioning System (GPS) network(s), which can be a part of enterprise NW(s) 2680. It is to be noted that server(s) 2614 can include one or more processors configured to confer at least in part the functionality of macro network platform 2610. To that end, the one or more processors can execute code instructions stored in memory 2630, for example.

In example wireless environment 2600, memory 2630 stores information related to operation of macro network platform 2610. Information can include business data associated with subscribers; market plans and strategies, e.g., promotional campaigns, business partnerships; operational data for mobile devices served through macro network platform; service and privacy policies; end-user service logs for law enforcement; and so forth. Memory 2630 can also store information from at least one of telephony network(s) 2640, WAN 2650, SS7 network 2660, enterprise NW(s) 2670, or service NW(s) 2680.

Regarding femto network platform 2680, it can include femto gateway node(s) 2684, which have substantially the same functionality as PS gateway node(s) 2618. Additionally, femto gateway node(s) 2684 can also include substantially all functionality of serving node(s) 2616. Disparate gateway node(s) 2684 can control or operate disparate sets of deployed femto APs, which can be a part of femto RAN 2690. In an aspect of the subject innovation, femto gateway node(s) 2684 can aggregate operational data received from deployed femto APs.

Memory 2686 can retain additional information relevant to operation of the various components of femto network platform 2680. For example, operational information that can be stored in memory 2686 can comprise, but is not limited to, subscriber intelligence; contracted services; maintenance and service records; femtocell configuration, e.g., devices served through femto RAN 2690, authorized subscribers associated with one or more deployed femto APs; service policies and specifications; privacy policies; add-on features; so forth.

Server(s) 2682 have substantially the same functionality as described in connection with server(s) 2614. In an aspect, server(s) 2682 can execute multiple application(s) that provide service, e.g., voice and data, to wireless devices served through femto RAN 2690. Server(s) 2682 can also provide security features to femto network platform. In addition, server(s) 2682 can manage, e.g., schedule, queue, format, substantially all packetized flows, e.g., IP-based, frame relay-based, ATM-based, it generates in addition to data received from macro network platform 2610. Furthermore, server(s) 2682 can effect provisioning of femtocell service, and effect operations and maintenance. It is to be noted that server(s) 2682 can include one or more processors configured to provide at least in part the functionality of femto network platform 2680. To that end, the one or more processors can execute code instructions stored in memory 2686, for example.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of mobile wireless devices. A processor may also be implemented as a combination of computing processing units.

In the subject specification, terms such as "store," "data store," data storage," "database," and substantially any other information storage component relevant to operation and functionality of a component, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, which can be included in memory devices 2420, memory 2545, memory 2630, and memory 2686, can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 27:
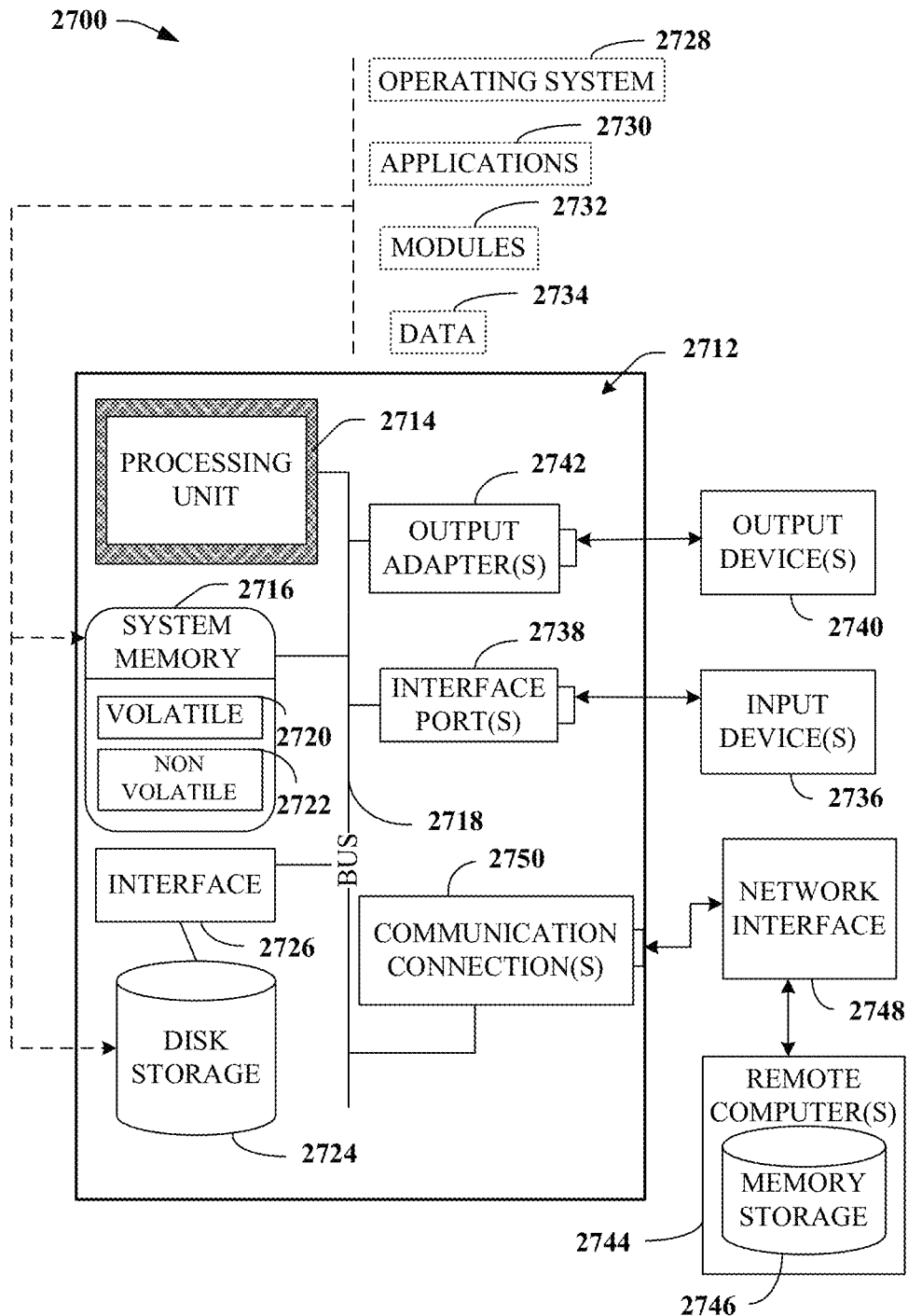
FIG. 27 illustrates a block diagram of a computer operable to execute the disclosed methods and apparatus, in accordance with an embodiment.
Figure 28:
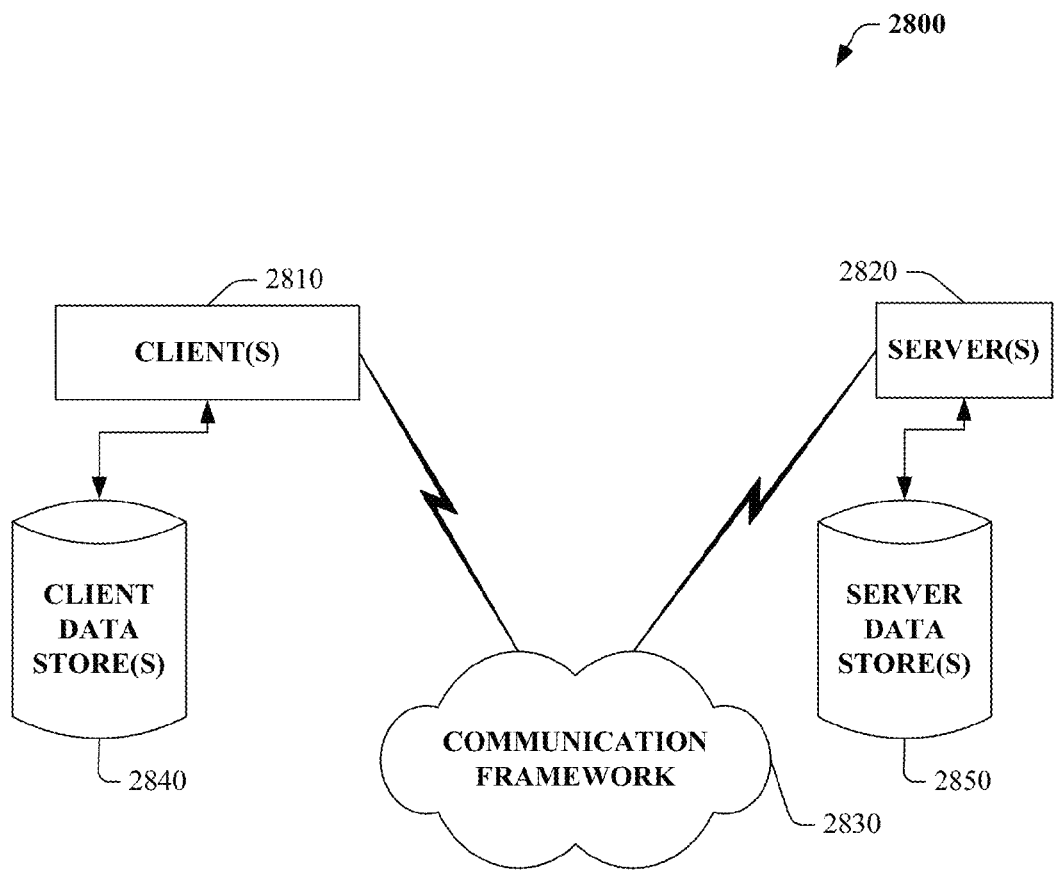
FIG. 28 illustrates a schematic block diagram of an exemplary computing environment, in accordance with an embodiment.

In order to provide a context for the various aspects of the disclosed subject matter, FIGS. 27 and 28, as well as the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types.

Moreover, those skilled in the art will appreciate that the inventive systems may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network; however, some if not all aspects of the subject disclosure can be practiced on stand-alone computers. In a distributed computing environment, program modules may be located in both local and remote memory storage devices.

With reference to FIG. 27, a block diagram of a computer 2700 operable to execute the disclosed systems and methods, in accordance with an embodiment, includes a computer 2712. The computer 2712 includes a processing unit 2714, a system memory 2716, and a system bus 2718. The system bus 2718 couples system components including, but not limited to, the system memory 2716 to the processing unit 2714. The processing unit 2714 can be any of various available processors. Dual microprocessors and other multiprocessor architectures also can be employed as the processing unit 2714.

The system bus 2718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

The system memory 2716 includes volatile memory 2720 and nonvolatile memory 2722. The basic input/output system (BIOS), containing the basic routines to transfer information between elements within the computer 2712, such as during start-up, is stored in nonvolatile memory 2722. By way of illustration, and not limitation, nonvolatile memory 2722 can include ROM, PROM, EPROM, EEPROM, or flash memory. Volatile memory 2720 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2712 also includes removable/non-removable, volatile/nonvolatile computer storage media. FIG. 27 illustrates, for example, disk storage 2724. Disk storage 2724 includes, but is not limited to, devices like a magnetic disk drive, floppy disk drive, tape drive, Jaz drive, Zip drive, LS-100 drive, flash memory card, or memory stick. In addition, disk storage 2724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2724 to the system bus 2718, a removable or non-removable interface is typically used, such as interface 2726.

It is to be appreciated that FIG. 27 describes software that acts as an intermediary between users and the basic computer resources described in the suitable operating environment 2700. Such software includes an operating system 2728. Operating system 2728, which can be stored on disk storage 2724, acts to control and allocate resources of the computer system 2712. System applications 2730 take advantage of the management of resources by operating system 2728 through program modules 2732 and program data 2734 stored either in system memory 2716 or on disk storage 2724. It is to be appreciated that the disclosed subject matter can be implemented with various operating systems or combinations of operating systems.

A user enters commands or information into the computer 2711 through input device(s) 2736. Input devices 2736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2714 through the system bus 2718 via interface port(s) 2738. Interface port(s) 2738 include, for example, a serial port, a parallel port, a game port, and a universal serial bus (USB). Output device(s) 2740 use some of the same type of ports as input device(s) 2736.

Thus, for example, a USB port may be used to provide input to computer 2712 and to output information from computer 2712 to an output device 2740. Output adapter 2742 is provided to illustrate that there are some output devices 2740 like monitors, speakers, and printers, among other output devices 2740, which use special adapters. The output adapters 2742 include, by way of illustration and not limitation, video and sound cards that provide a means of connection between the output device 2740 and the system bus 2718. It should be noted that other devices and/or systems of devices provide both input and output capabilities such as remote computer(s) 2744.

Computer 2712 can operate in a networked environment using logical connections to one or more remote computers, such as remote computer(s) 2744. The remote computer(s) 2744 can be a personal computer, a server, a router, a network PC, a workstation, a microprocessor based appliance, a peer device or other common network node and the like, and typically includes many or all of the elements described relative to computer 2712.

For purposes of brevity, only a memory storage device 2746 is illustrated with remote computer(s) 2744. Remote computer(s) 2744 is logically connected to computer 2712 through a network interface 2748 and then physically connected via communication connection 2750. Network interface 2748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2750 refer(s) to the hardware/software employed to connect the network interface 2748 to the bus 2718. While communication connection 2750 is shown for illustrative clarity inside computer 2712, it can also be external to computer 2712. The hardware/software for connection to the network interface 2748 can include, for exemplary purposes only, internal and external technologies such as, modems including regular telephone grade modems, cable modems and DSL modems, ISDN adapters, and Ethernet cards.

FIG. 28 illustrates a schematic block diagram of an exemplary computing environment 2830, in accordance with an embodiment. The system 2800 includes one or more client(s) 2810. The client(s) 2810 can be hardware and/or software (e.g., threads, processes, computing devices). The system 2800 also includes one or more server(s) 2820. Thus, system 2800 can correspond to a two-tier client server model or a multi-tier model (e.g., client, middle tier server, data server), amongst other models. The server(s) 2820 can also be hardware and/or software (e.g., threads, processes, computing devices). The servers 2820 can house threads to perform transformations by employing the subject innovation, for example. One possible communication between a client 2810 and a server 2820 may be in the form of a data packet transmitted between two or more computer processes.

The system 2800 includes a communication framework 2830 that can be employed to facilitate communications between the client(s) 2810 and the server(s) 2820. The client(s) 2810 are operatively connected to one or more client data store(s) 2840 that can be employed to store information local to the client(s) 2810. Similarly, the server(s) 2820 are operatively connected to one or more server data store(s) 2850 that can be employed to store information local to the servers 2820.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments may be used or modifications and additions may be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
creating, by a system comprising a processor, a virtual neighbor object comprising a channel number and a scrambling code;
referencing, by the system, femtocell devices utilizing the virtual neighbor object;
sending, by the system, neighbor information directed to a mobile device, wherein the neighbor information comprises the virtual neighbor object and represents channels of neighboring femtocell devices within a defined proximity to the mobile device; and
in response to the sending of the neighbor information, granting, by the system based on the virtual neighbor object and an access restriction that references a signal quality associated with a communication between a femtocell device of the femtocell devices and the mobile device, an idle mode reselection between a wireless access point device and the femtocell device.

2. The method of claim 1, wherein the access restriction comprises an access control list associated with the femtocell device.

3. The method of claim 1, wherein the sending the neighbor information comprises directing the femtocell device to transmit the neighbor information to the mobile device.

4. The method of claim 1, further comprising:
assigning, by the system, an access control parameter to the femtocell device.

5. A system, comprising:
a memory that stores executable instructions; and
a processor, coupled to the memory, that facilitates execution of the executable instructions to perform operations, comprising:
generating a virtual neighbor object comprising a channel number and a scrambling code;
associating the virtual neighbor object with femtocell devices;
sending neighbor data directed to a mobile wireless device, wherein the neighbor data comprises the virtual neighbor object and represents channels of neighboring femtocell devices within a defined proximity to the mobile wireless device; and
subsequent to the sending of the neighbor data, permitting, based on the virtual neighbor object and an access restriction that references a signal quality associated with a communication between a femtocell device of the femtocell devices and the mobile wireless device, an idle mode reselection between a base station device and the femtocell device.

6. The system of claim 5, wherein the access restriction comprises an access control list associated with the femtocell device.

7. The system of claim 5, wherein the sending the neighbor data comprises directing the femtocell device to transmit the neighbor data to the mobile wireless device.

8. The system of claim 5, wherein the operations further comprise:

assigning an access control parameter to the femtocell device.

9. The system of claim 5, wherein the base station device comprises a long term evolution access point device.

10. The system of claim 5, wherein the femtocell device comprises a Bluetooth™ access point device.

11. The system of claim 5, wherein the femtocell device comprises a worldwide interoperability for microwave access point device.

12. The system of claim 5, wherein the femtocell device comprises an Institute of Electrical and Electronics Engineers 802.11x based device.

13. A non-transitory computer-readable storage medium comprising executable instructions that, in response to execution, cause a mobile device comprising a processor to perform operations, comprising:

receiving neighbor data including a virtual neighbor object that comprises channel data that references a channel number and scrambling code data that references a scrambling code, wherein the virtual neighbor object is associated with femtocell devices and represents channels of proximate femtocell devices within a defined proximity to the mobile device; and in response to the receiving of the neighbor data, reselecting between a base station device and a femtocell device of the femtocell devices based on the virtual neighbor object and an access restriction that references a signal quality associated with a communication between the femtocell device and the mobile device.

14. The non-transitory computer-readable storage medium of claim 13, wherein the receiving the neighbor data comprises receiving the neighbor data from the femtocell device.

15. The non-transitory computer-readable storage medium of claim 13, wherein the access restriction comprises an identification associated with the mobile device.

16. The method of claim 4, wherein the granting the idle mode reselection comprises permitting the idle mode reselection based on the access control parameter.

17. The system of claim 8, wherein the permitting the idle mode reselection comprises permitting the idle mode reselection based on the access control parameter.

18. The non-transitory computer-readable storage medium of claim 13, wherein the operations further comprise:

assigning an access control parameter to the femtocell device.

19. The non-transitory computer-readable storage medium of claim 18, wherein the reselecting comprises reselecting between the base station device and the femtocell device based on the access control parameter.

20. The non-transitory computer-readable storage medium of claim 13, wherein the access restriction comprises an access control list associated with the femtocell device.

* * * * *